(12) United States Patent
Gousev et al.

(10) Patent No.: US 9,986,211 B2
(45) Date of Patent: *May 29, 2018

(54) LOW-POWER ALWAYS-ON FACE DETECTION, TRACKING, RECOGNITION AND/OR ANALYSIS USING EVENTS-BASED VISION SENSOR

(71) Applicant: QUALCOMM Incorporated, San Diego, CA (US)

(72) Inventors: Evgeni Gousev, Saratoga, CA (US); Alok Govil, Fremont, CA (US); Jacek Maitan, Mountain View, CA (US); Nelson Rasquinha, San Diego, CA (US); Venkat Rangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/400,914

(22) Filed: Jan. 6, 2017

(65) Prior Publication Data

US 2017/0374322 A1 Dec. 28, 2017

Related U.S. Application Data

(63) Continuation of application No. 14/866,549, filed on Sep. 25, 2015, now Pat. No. 9,554,100.

(Continued)

(51) Int. Cl.
*H04N 7/18* (2006.01)
*G06K 9/60* (2006.01)
(Continued)

(52) U.S. Cl.
CPC ......... *H04N 7/183* (2013.01); *G06K 9/00362* (2013.01); *G06K 9/00986* (2013.01);
(Continued)

(58) Field of Classification Search
CPC .. H04N 7/183; H04N 5/2355; H04N 5/23219; H04N 5/23241; G06K 9/00228;
(Continued)

(56) References Cited

U.S. PATENT DOCUMENTS

| 5,289,023 A | 2/1994 | Mead |
| 5,543,590 A | 8/1996 | Gillespie et al. |

(Continued)

FOREIGN PATENT DOCUMENTS

| CN | 102663409 A | 9/2012 |
| DE | 102006023611 A1 | 11/2007 |

(Continued)

OTHER PUBLICATIONS

Author: Di Huang, Caifeng Shan, Mohsen Ardabilian, Yunhong Wang, Liming Chen Title: Local Binary Patterns and Its Application to Facial Image Analysis: A Survey; Date: Nov. 2011 Publisher: IEEE; Edition: IEEE Transactions on Systems, Man and Cybernetics-Part C: Applications and Reviews, vol. 41, No. 6; pp. 765-781.*

(Continued)

*Primary Examiner* — Tat C Chio
(74) *Attorney, Agent, or Firm* — Kilpatrick Townsend & Stockton, LLP

(57) ABSTRACT

Techniques disclosed herein utilize a vision sensor that integrates a special-purpose camera with dedicated computer vision (CV) computation hardware and a dedicated low-power microprocessor for the purposes of detecting, tracking, recognizing, and/or analyzing subjects, objects, and scenes in the view of the camera. The vision sensor processes the information retrieved from the camera using the included low-power microprocessor and sends "events" (or indications that one or more reference occurrences have occurred, and, possibly, associated data) for the main processor only when needed or as defined and configured by the (Continued)

application. This allows the general-purpose microprocessor (which is typically relatively high-speed and high-power to support a variety of applications) to stay in a low-power (e.g., sleep mode) most of the time as conventional, while becoming active only when events are received from the vision sensor.

30 Claims, 13 Drawing Sheets

Related U.S. Application Data

(60) Provisional application No. 62/057,800, filed on Sep. 30, 2014, provisional application No. 62/057,972, filed on Sep. 30, 2014, provisional application No. 62/058,009, filed on Sep. 30, 2014.

(51) Int. Cl.
  *G06K 9/46* (2006.01)
  *G06K 9/00* (2006.01)
  *H04N 5/232* (2006.01)
  *H04N 5/235* (2006.01)

(52) U.S. Cl.
  CPC ........... *G06K 9/4619* (2013.01); *G06K 9/605* (2013.01); *H04N 5/2355* (2013.01); *H04N 5/23219* (2013.01); *H04N 5/23241* (2013.01); *G06K 9/00228* (2013.01); *G06K 2009/4666* (2013.01)

(58) Field of Classification Search
  CPC ........... G06K 9/00362; G06K 9/00986; G06K 9/4619; G06K 9/605; G06K 2009/4666
  See application file for complete search history.

(56) References Cited

U.S. PATENT DOCUMENTS

| | | | |
|---|---|---|---|
| 6,011,257 A | 1/2000 | Endoh | |
| 6,459,509 B1 | 10/2002 | Maciey et al. | |
| 7,038,185 B1 | 5/2006 | Tumblin et al. | |
| 7,151,844 B2 | 12/2006 | Stevenson et al. | |
| 7,377,643 B1 | 5/2008 | Chock et al. | |
| 7,744,216 B1 | 6/2010 | Uhlhorn | |
| 8,203,440 B2 | 6/2012 | Schofield et al. | |
| 8,462,996 B2 | 6/2013 | Moon et al. | |
| 8,902,971 B2 | 12/2014 | Pace et al. | |
| 8,928,793 B2 | 1/2015 | McMahon | |
| 9,332,239 B2 | 5/2016 | Cote et al. | |
| 9,471,840 B2 | 10/2016 | Govil et al. | |
| 9,554,100 B2* | 1/2017 | Gousev | G06K 9/00362 |
| 2001/0028405 A1 | 10/2001 | Kondo et al. | |
| 2002/0012459 A1 | 1/2002 | Oh | |
| 2002/0100862 A1 | 8/2002 | Liu | |
| 2004/0155175 A1 | 8/2004 | McNulty | |
| 2009/0020612 A1 | 1/2009 | Drzymala et al. | |
| 2009/0060383 A1* | 3/2009 | Li | G06K 9/00597 382/282 |
| 2009/0157707 A1 | 6/2009 | Ito et al. | |
| 2010/0034529 A1 | 2/2010 | Jelinek et al. | |
| 2010/0182468 A1 | 7/2010 | Posch et al. | |
| 2010/0295782 A1 | 11/2010 | Binder | |
| 2010/0316254 A1* | 12/2010 | Kirsch | G06K 9/209 382/103 |
| 2011/0128428 A1 | 6/2011 | Takatoku et al. | |
| 2011/0298755 A1 | 12/2011 | Ni | |
| 2012/0138774 A1 | 6/2012 | Kelly et al. | |
| 2012/0242820 A1 | 9/2012 | Hanna et al. | |
| 2012/0313960 A1 | 12/2012 | Segawa et al. | |
| 2013/0054505 A1 | 2/2013 | Ross et al. | |
| 2013/0055001 A1 | 2/2013 | Jeong et al. | |
| 2013/0121590 A1 | 5/2013 | Yamanaka et al. | |
| 2013/0176552 A1 | 7/2013 | Brown et al. | |
| 2013/0229508 A1* | 9/2013 | Li | G06F 1/3287 348/77 |
| 2014/0003663 A1 | 1/2014 | Li et al. | |
| 2014/0118592 A1 | 5/2014 | Yoon et al. | |
| 2014/0125799 A1 | 5/2014 | Bos et al. | |
| 2014/0149754 A1 | 5/2014 | Silva et al. | |
| 2014/0169663 A1 | 6/2014 | Han et al. | |
| 2014/0192066 A1 | 7/2014 | Savransky et al. | |
| 2014/0204238 A1 | 7/2014 | Cao et al. | |
| 2014/0319325 A1 | 10/2014 | Kawahito et al. | |
| 2014/0320666 A1 | 10/2014 | Badawy et al. | |
| 2014/0363049 A1 | 12/2014 | Benosman et al. | |
| 2014/0368423 A1 | 12/2014 | Brenckle et al. | |
| 2014/0368626 A1 | 12/2014 | John et al. | |
| 2014/0368712 A1 | 12/2014 | Park et al. | |
| 2015/0036942 A1 | 2/2015 | Smirnov et al. | |
| 2015/0311977 A1 | 10/2015 | Jovicic et al. | |
| 2015/0331480 A1 | 11/2015 | Zhou et al. | |
| 2015/0358525 A1 | 12/2015 | Lord | |
| 2016/0091946 A1 | 3/2016 | Govil et al. | |
| 2016/0092735 A1 | 3/2016 | Govil | |
| 2016/0094800 A1 | 3/2016 | Gousev | |
| 2016/0094814 A1 | 3/2016 | Gousev | |
| 2016/0117544 A1 | 4/2016 | Hoyos et al. | |
| 2016/0117564 A1 | 4/2016 | Govil et al. | |
| 2016/0241338 A1 | 8/2016 | Ganick et al. | |
| 2016/0275348 A1 | 9/2016 | Slaby et al. | |
| 2016/0283789 A1 | 9/2016 | Slaby et al. | |
| 2016/0335495 A1 | 11/2016 | Kim et al. | |
| 2017/0032216 A1 | 2/2017 | Govil et al. | |
| 2017/0064211 A1 | 3/2017 | Omid-Zohoor | |
| 2017/0091550 A1 | 3/2017 | Feng et al. | |
| 2017/0116478 A1 | 4/2017 | Gousev et al. | |
| 2017/0132466 A1 | 5/2017 | Gousev et al. | |
| 2017/0161579 A1 | 6/2017 | Gousev et al. | |

FOREIGN PATENT DOCUMENTS

| | | |
|---|---|---|
| DE | 102008052930 A1 | 4/2010 |
| EP | 2528015 A1 | 11/2012 |
| EP | 2665257 A1 | 11/2013 |
| EP | 2709066 A1 | 3/2014 |
| EP | 2757769 A1 | 7/2014 |
| JP | 2008131407 | 6/2008 |
| JP | 2013003787 A | 1/2013 |
| WO | 8605018 A1 | 8/1986 |
| WO | 2012093381 A1 | 7/2012 |
| WO | 2014015194 | 1/2014 |
| WO | 2015148209 A1 | 10/2015 |
| WO | 2016010721 A1 | 1/2016 |

OTHER PUBLICATIONS

Anonymous: "OpenCV—Haar Cascades vs. LBP Cascades in Face Detection—Stack Overflow", Stack Overflow, Jan. 9, 2012 (Jan. 9, 2012), XP055230385, Retrieved from the Internet Nov. 23, 2015: URL: http://stackoverflow.com/questions/8791178/haar-cascades-vs-lbp-cascades-in-face-detection.

Butler M., et al., "ROI processing offers opportunities," Vision Systems Design, May 1, 2006 (May 1, 2006), XP055232974, Retrieved from the Internet: URL: http://www.vision-systems.com/articles/print/volume-11/issue-5/features/component-integration/roi-processing-offers-opportunities.html [retrieved on Dec. 2, 2015] the whole document.

Cho J., et al., "FPGA-Based Face Detection System Using Haar Classifiers", Field Programmable Gate Arrays, Feb. 22, 2009-Feb. 24, 2009, pp. 103-112, XP058022870, DOI: 10.1145/1508128. 1508144, ISBN: 978-1-60558-410-2.

Choi J., et al., "A 3.4[mu]W CMOS Image Sensor with Embedded Feature-extraction Algorithm for Motion-Triggered Object-of-interest Imaging," Solid-State Circuits Conference Digest of Technical Papers (ISSCC), 2013 IEEE International, IEEE, Feb. 17, 2013 (Feb. 17, 2013), pp. 478-479, XP032350659, DOI: 10.1109/ISSCC. 2013.6487822 ISBN: 978-1-4673-4515-6.

(56) References Cited

OTHER PUBLICATIONS

Delbruck T., et al., "Activity-Driven, Event-Based Vision Sensors," Proceedings of 2010 IEEE International Symposium on Circuits and Systems (ISCAS), 2010, 4 pages.

Etienne-Cummings R., et al., "A Programmable Focal-Plane MIMD Image Processor Chip", IEEE Journal of Solid-State Circuits, Jan. 2001, vol. 36, No. 1, pp. 64-73.

Fernandez-Berni J., et al., "Bottom-up Performance Analysis of Focal-Plane Mixed-Signal Hardware for Viola-Jones Early Vision Tasks", International Journal of Circuit Theory and Applications, vol. 43, No. 8, Apr. 16, 2014 (Apr. 16, 2014), pp. 1063-1079, XP055230917, ISSN: 0098-9886, DOI: 10.1002/cta.1996.

Fernandez-Berni J., et al., "Focal-Plane Sensing-Processing: A Power-Efficient Approach for the Implementation of Privacy-Aware Networked Visual Sensors," Sensors, vol. 14, No. 8, Aug. 19, 2014 (Aug. 19, 2014), pp. 15203-15226, XP055230039, DOI: 10.3390/s140815203.

Hartenstein R W., et al., "An Embedded Accelerator for Real World Computing", Proceedings of IFIP International conference on Very Large Scale Integration, VLSI'97, Aug. 26, 1997 (Aug. 26, 1997), pp. 1-12, XP055234128, Gramado, Brazil the whole document.

Hsiao P.Y., et al., "A Novel CMOS Imager with 2-Dimensional Binarization and Edge Detection for Highly Integrated imaging Systems," Digest of Technical Papers. International Conference on Consumer Electronics, 2006, pp. 71-72.

Huang D., et al., " Local Binary Patterns and Its Application to Facial Image Analysis: A Surve," IEEE Transactions on Systems, Man, and Cybernetics: Part C:Applications and Reviews, IEEE Service Center, Piscataway, NJ, US, vol. 41, No. 6, Nov. 1, 2011 (Nov. 1, 2011), pp. 765-781, XP011363204, ISSN: 1094-6977, DOI: 10.1109/TSMCC.2011.2118750 abstract sections I, III, V, VI.

International Search Report and Written Opinion—PCT/US2015/052684—ISA/EPO—dated Dec. 15, 2015.

Kriss M: "Handbook of Digital Imaging", 2015, Wiley & Sons Ltd. Chichester, West Sussex, XP002751874, ISBN: 978-0-470-51059-9 vol. 1, p. 124-129,133-137, the whole document.

Lahdenoja O., et al., "A Massively Parallel Algorithm for Local Binary Pattern based Face Recognition", IEEE, ISCAS 2006, pp. 3730-3733.

Lahdenoja O., et al., "Extracting Local Binary Patterns with MIPA4k Vision Processor," 12th International Workshop on Cellular Nanoscale Networks and their Applications (CNNA), IEEE, Piscataway, NJ, USA, Feb. 3, 2010 (Feb. 3, 2010), pp. 1-5, XP031648245, ISBN: 978-1-4244-6679-5.

Laiho M. et al. "Dedicated Hardware for Parallel Extraction of Local Binary Pattern Feature Vectors", 2005 9th International Workshop on Cellular Neural Networks and Their Applications, IEEE, May 2005, pp. 27-30.

Moloney D., et al., "Myriad 2: Eye of the Computational Vision Storm", Hot Chips, Aug. 12, 2014, XP055230946, Retrieved from the Internet on Nov. 24, 2015: URL: http://www.hotchips.org/wp-content/uploads/hc_archives/hc26/HC26-12-day2-epub/HC26.12-6-HP-ASICs-epub/HC26.12.620-Myriad2-Eye-Moloney-Movidius-provided.pdf.

Muehlfellner P., et al., "Selection, Analysis and Implementation of Image-based Feature Extraction Approaches or a Heterogenous, Modular and FPGA-based Architecture for Camera-based Driver Assistance Systems Master Thesis Embedded and Intelligent Systems", Technical Report, Sep. 1, 2011 (Sep. 1, 2011), XP055232797, Retrieved from the Internet: URL: https://www.diva-portal.org/smash/get/diva2:444576/FULLTEXT01.pdf [retrieved on Dec. 2, 2015] chapter 4.

"Myriad 2 Vision Processor Bringing Computational Imaging and Visual Awareness to Mobile, Wearable, and Embedded Markets Product Brief", Aug. 1, 2014, XP055230944, Retrieved from the Internet on Nov. 24, 2015: URL: http://uploads.movidius.com/1441734401-Myriad-2-product-brief.pdf.

Pierzchala E., et al., "High Speed Field Programmable Analog Array Architecture Design", Analogix Corporation, Feb. 1994, 61 pages.

Poikonen J., et al., "MIPA4k: A 64x64 Cell Mixed-mode Image Processor Array", ISCAS 2009, IEEE, May 24, 2009, pp. 1927-1930.

Posch C., et al., "An Asynchronous Time-Based Image Sensor," IEEE International Symposium on Circuits and Systems (ISCAS), 2008, 4 pages.

Qualcomm, "FAST Corners", Sep. 15, 2015, 6 Slides.

Shi Y., et al., "Smart Cameras: Fundamentals and Classification," Chapter 2, A.N. Belbachir (Ed.), Springer Science+Business Media, LLC 2010, pp. 19-34.

Stack Overflow, "FAST Detector in every levels on Gaussian Pyramids", matlab, Retrieved from Internet, URL: http://stackoverflow.com/questions/24222611/fast-detector-in-every-levels-on-gaussian-pyramids , on Sep. 11, 2015, 2 Pages.

Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.

Trein J., et al., "Development of a FPGA Based Real-Time Blob Analysis Circuit," ISSC 2007, Derry, Sep. 13-14, 2007, 6 pages.

Wikipedia, "Features from accelerated segment test", Retrieved from Internet, URL: https://en.wikipedia.org/wiki/Features_from_accelerated_segment_test#High-speed_test , on Sep. 11, 2015, 6 Pages.

Wyatt J.L., et al., "The MIT Vision Chip Project: Analog VLSI Systems for Fast Image Acquisition and Processing," IEEE International Conference on Robotics and Automation, 1991, vol. 2, pp. 1330-1335.

Yang M., et al., "Comparison of Spike Encoding Schemes in Asynchronous Vision Sensors: Modeling and Design", IEEE, International Symposium on Circuits and Systems (ISCAS), Jun. 1, 2014 (Jun. 1, 2014), pp. 2632-2635, XP032624686, DOI: 10.1109/ISCAS.2014.6865713 [retrieved on Jul. 24, 2014].

Yu H, "Fast Corner detection—Machine Learning for high speed corner detection", Nov. 16, 2010, 60 Slides.

De Marsico M., et al., "FIRME: Face and Iris Recognition for Mobile Engagement", Image and Vision Computing, vol. 32, No. 12, Dec. 2014, pp. 1-13.

Kazemi V., et al., "One Millisecond Face Alignment with an Ensemble of Regression Trees", IEEE Conference on computer Vision and Pattern Recognition (CVPR), 2014, pp. 1-8.

Thavalengal S., et al., "Iris Liveness Detection for Next Generation Smartphones", IEEE Transactions on Consumer Electronics, IEEE Service Center, New York, NY, US, vol. 62, No. 2, May 1, 2016, pp. 95-102, XP011617322, ISSN: 0098-3063, DOI: 10.1109/TCE.2016.7514667 [retrieved on Jul. 15, 2016].

* cited by examiner

LOW-POWER ALWAYS-ON FACE DETECTION, TRACKING, RECOGNITION AND/OR ANALYSIS USING EVENTS-BASED VISION SENSOR

CROSS-REFERENCE TO RELATED APPLICATION

This application is a continuation of U.S. application Ser. No. 14/866,549, entitled "LOW-POWER ALWAYS-ON FACE DETECTION, TRACKING, RECOGNITION AND/OR ANALYSIS USING EVENTS-BASED VISION SENSOR" filed on Sep. 25, 2015 which claims the benefit of U.S. Provisional Patent Application Ser. Nos. 62/057,800, entitled "LOW-POWER ALWAYS-ON FACE DETECTION, TRACKING, RECOGNITION AND/OR ANALYSIS USING EVENTS-BASED VISION SENSOR," filed on Sep. 30, 2014, U.S. Provisional Patent Application Ser. Nos. 62/057,972, entitled "SENSOR SYSTEM FOR COMPUTER VISION COMPUTATIONS AND LOWER-POWER OPTICAL SENSOR READINGS," filed on Sep. 30, 2014, and U.S. Provisional Patent Application Ser. Nos. 62/058,009, entitled "SCANNING WINDOW IN HARDWARE FOR LOW-POWER OBJECT-DETECTION IN IMAGES," filed on Sep. 30, 2014, all of which are assigned to the assignee hereof and incorporated by reference herein for all purposes.

BACKGROUND

Human-computer interaction uses many modalities including language (typing, voice recognition, on-screen text display, speech synthesis, and the like) and vision (still and video cameras, graphic displays, and the like). Face detection, recognition, expressions, and so forth forms an important part of human-to-human communication and thereby is important for human-machine interaction as well. There are many methods and applications available for detection, tracking, recognition of face(s) in still images and videos, including emotion detection, gender classification, lip reading, eye/gaze tracking, etc.

Traditional systems for face or general object detection and tracking use computing-intensive algorithms requiring high-speed, power-hungry microprocessors, high-consumption of data path bandwidth for moving large numbers of operands, and heavy usage of memory. These systems typically use a still/video camera capturing and delivering intensity-based images to a general-purpose microprocessor, which analyzes the images, displays the images gleaned on a screen, or otherwise acts based on the scene-information thus retrieved. Given the high power consumption of the existing systems, use-cases and applications for face or general object detection have become fairly limited. For example, the camera and the processor sub-system cannot be kept turned on for most of the time for portable, battery-powered devices.

SUMMARY

Techniques disclosed herein utilize a vision sensor that integrates a special-purpose camera with dedicated computer vision (CV) computation hardware and a dedicated low-power microprocessor for the purposes of detecting, tracking, recognizing, and/or analyzing subjects, objects, and scenes in the view of the camera. The vision sensor processes the information retrieved from the camera using the included low-power microprocessor and sends "events" (or indications that one or more reference occurrences have occurred) for the main processor only when needed or as defined and configured by the application. This allows the general-purpose microprocessor (which is typically relatively high-speed and high-power to support a variety of applications) to stay in a low-power (e.g., sleep mode) most of the time as conventional, while becoming active only when events are retrieved from the vision sensor.

A smart sensor for sensing dynamic scene-based occurrences, according to the description, can comprise dedicated computer vision (CV) computation hardware configured to receive sensor data from a sensor array comprising more than one sensor pixel and capable of computing one or more CV features using readings from neighboring sensor pixels of the sensor array, and a first processing unit communicatively coupled with the dedicated CV computation hardware and configured to process signals resulting from operations based on the one or more computed CV features. The smart sensor can be configured to generate an event to be received by a second processing unit in response to the processing of the signals resulting from the operations based on the one or more computed CV features by the first processing unit, the event indicating a reference occurrence for the second processing unit.

The smart sensor can include one or more of the following features. The reference occurrence can be one or more of a coming into view of a human face, a coming into view of a human body, an emotion expressed on a human face, coming into view of an non-human animal face, coming into view of a non-human animal body, coming into view of a human hand, a hand gesture, a coming into view of a reference object, a change from an indoor environment to an outdoor environment, a reference movement, rapid movement in a scene indicating a fall, motion toward an object indicating a risk of collision, movement or objects in a scene indicating danger, or any combination thereof. The event may comprise face detection. The dedicated CV computation hardware may be configured to provide Local Binary Patterns (LBPs). The smart sensor may comprise cascade classifier hardware configured to detect a presence of a reference object in a subset of the sensor data coupled to the dedicated CV computation hardware. The operations based on the one or more computed CV features may comprise operations performed by the cascade classifier hardware, the reference occurrence being associated with the reference object The first processing unit may be configured to receive an indication from the cascade classifier hardware of the presence of the reference object when the presence of the reference object is detected by the cascade classifier hardware. The dedicated CV computation hardware may be configured to receive raw sensor data from the sensor array and no image signal processing circuitry is disposed between the sensor array and the dedicated CV computation hardware. The dedicated CV computation hardware may comprise an integrated circuit. The smart sensor may be configured to disable at least part of the dedicated CV computation hardware to generate at least one lower-power optical sensor reading indicative of ambient light sensing, a proximity detection, a proximity to a reference object, a motion detection, or any combination thereof. The smart sensor may generate the reference occurrence based on the at least one lower-power optical sensor reading. The smart sensor may be configured to disable at least part of the dedicated CV computation hardware while operating in a lower-power mode, detect a scene change in the lower-power mode, and to activate the dedicated CV computation hardware based on detection of the scene change. The event may indicate the reference occurrence for the second processing unit and further includes data associated with the reference occurrence. The smart sensor may be configured to the perform a higher-power operation as at least part of the operations based on the one or more computed CV features includes, the higher-power operation consuming more power than a lower-power operation, and provide a parameter for the lower-power operation is based on the higher-power operation. The smart sensor may be configured to perform a lower-power operation as at least part of the operations based on the one or more computed CV features includes, the lower-power operation consuming less power than a higher-power operation, and provide a sensor reading for the higher-power operation.

An example apparatus for determining face detection events, according to the description, may comprise a sensor array comprising more than one sensor pixel, dedicated computer vision (CV) computation hardware capable of receiving sensor data from the sensor array and computing CV features using readings from neighboring sensor pixels of the sensor array, and a first processing unit communicatively coupled with the dedicated CV computation hardware and configured to determine, from one or more signals resulting from operations based on the one or more computed CV features that a face has been detected, and in response to the determination, generate a face-detected event, to be received by a second processing unit.

The apparatus can include one or more of the following features. The apparatus may comprise the second processing unit, wherein the first processing unit is configured to communicate the face-detected event to the second processing unit while the second processing unit is operating in a low-power mode. The dedicated CV computation hardware may be configured to receive raw sensor data from the sensor array and no image signal processing circuitry is disposed between the sensor array and the dedicated CV computation hardware. The apparatus may comprise peripheral circuitry configured to provide at least one of a timing operation, a focusing operation, an auto-exposure correction operation, object detection, object recognition, storing a scanning window, an event-queuing and/or processing operation, analog processing, analog-to-digital conversion, an integration operation, CV feature computation, a cascade-classifier-based classification, a histogram-based classification, or memory buffering, or any combination thereof. The apparatus may comprise the second processing unit, and the first processing unit may be further configured to communicate the face-detected event to the second processing unit while the second processing unit is operating in a low-power mode.

A method for sensing dynamic scene-based occurrences with an apparatus, according to the description, may comprise receiving, with dedicated computer vision (CV) computation hardware, sensor data from a sensor array comprising more than one sensor pixel, computing, with the dedicated CV computation hardware, one or more CV features using readings from neighboring sensor pixels of the sensor array, processing, with a first processing unit, signals resulting from operations based on the one or more computed CV features, and generating an event to be received by a second processing unit in response to the processing of the signals resulting from the operations based on the one or more computed CV features by the first processing unit, the event indicating a reference occurrence for the second processing unit.

The method may further include one or more of the following features. The reference occurrence may be one or more of a coming into view of a human face, a coming into view of a human body, an emotion expressed on a human face, coming into view of an non-human animal face, coming into view of a non-human animal body, coming into view of a human hand, a hand gesture, a coming into view of a reference object, a change from an indoor environment to an outdoor environment, a reference movement, rapid movement in a scene indicating a fall, motion toward an object indicating a risk of collision, movement or objects in a scene indicating danger, or any combination thereof. The method may comprise providing, with the dedicated CV computation hardware, Local Binary Patterns (LBPs). The method may comprise detecting, with cascade classifier hardware, a presence of a reference object in a subset of the sensor data, wherein the operations based on the one or more computed CV features comprise operations performed by the cascade classifier hardware, the reference occurrence being associated with the reference object. The method may comprise receiving, by the first processing unit, an indication from the cascade classifier hardware of the presence of the reference object when the presence of the reference object is detected by the cascade classifier hardware. The method may comprise disabling at least part of the dedicated CV computation hardware to generate at least one lower-power optical sensor reading indicative of ambient light sensing, a proximity detection, a proximity to a reference object, a motion detection, or any combination thereof. The method may further comprise detecting the reference occurrence based on the at least one lower-power optical sensor reading. The method may further comprise disabling at least part of the dedicated CV computation hardware while operating in a lower-power mode, detecting a scene change while operating in the lower-power mode; and activating the disabled at least part of the dedicated CV computation hardware based on detection of the scene change. Receiving with the dedicated CV computation hardware, the sensor data from the sensor array comprises receiving raw sensor data from the sensor array and wherein no image signal processing is performed on the sensor data prior to the receiving.

A method for determining face detection events, according to the description, may include receiving, with dedicated computer vision (CV) computation hardware, sensor data from a sensor array, computing one or more CV features using readings from neighboring sensor pixels of the sensor array, and using a first processing unit to: determine, from one or more signals resulting from operations based on the one or more computed CV features that a face has been detected, and in response to the determination, generate a face-detected event, to be received by a second processing unit. Receiving, with the dedicated CV computation hardware, the sensor data from the sensor array may comprise receiving raw sensor data from the sensor array and wherein no image signal processing is performed on the sensor data prior to the receiving.

BRIEF DESCRIPTION OF THE DRAWINGS

An understanding of the nature and advantages of various embodiments may be realized by reference to the following figures.

DETAILED DESCRIPTION

The ensuing description provides embodiment(s) only, and is not intended to limit the scope, applicability or configuration of the disclosure. Rather, the ensuing description of the embodiment(s) will provide those skilled in the art with an enabling description for implementing an embodiment. It is understood that various changes may be made in the function and arrangement of elements without departing from the scope of this disclosure.

Figure 1:
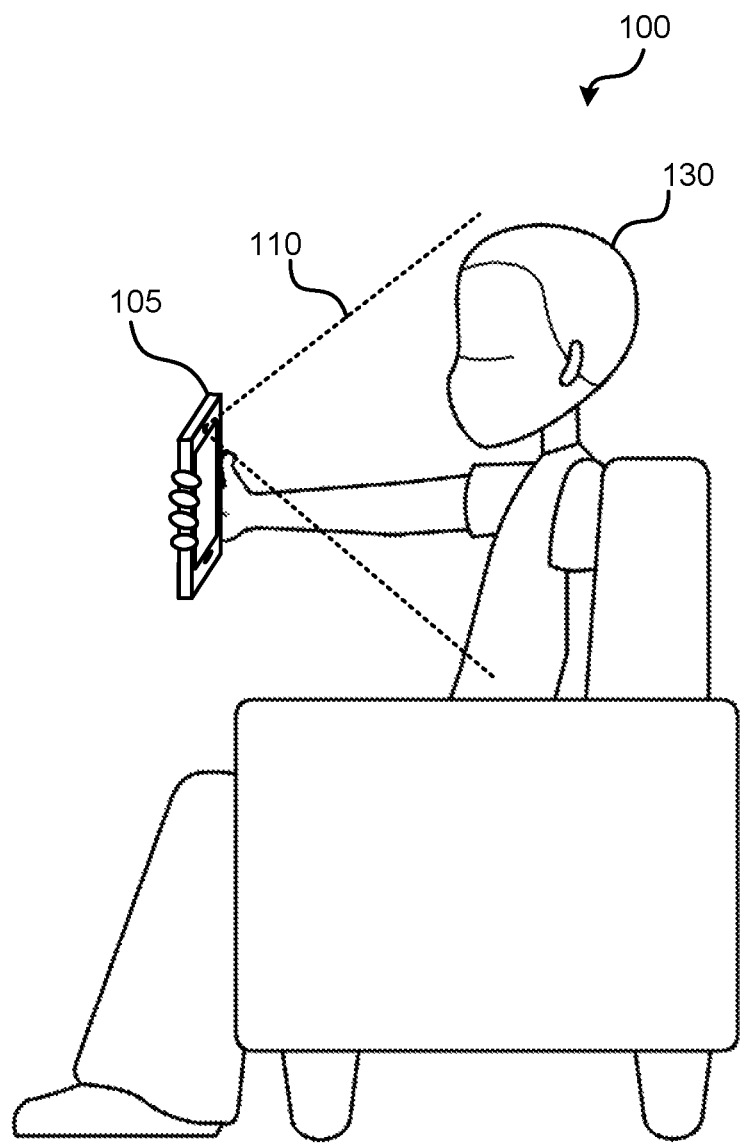
FIG. 1 illustrates an example setup in which a user may be interacting with a mobile device that incorporates the features and techniques described herein

FIG. 1 illustrates an example setup 100 in which a user 130 may be interacting with a mobile device 105 that incorporates the features and techniques described herein. Here, the user 130 may interact with the mobile device 105, at least in part, via a sensor system having a special-purpose camera, dedicated computer vision (CV) computation hardware, and a dedicated low-power microprocessor as described herein below. These features enable the mobile device 105 to detect, track, recognize, and/or analyze a subject (such as the user 130) and other objects and scenes within the field of view 105 of the camera. The sensor system processes the information retrieved from the camera using the included embedded processor and sends "events" (or indications that one or more reference occurrences have occurred) for the main processor only when needed or as defined and configured by the application. This allows the general-purpose microprocessor (which is typically relatively high-speed and high-power to support a variety of applications) to stay in a low-power (e.g., sleep mode) most of the time as conventional, while becoming active only when events are received from the sensor system. While illustrated and described with reference to mobile device 105, it is understood that a smart sensor capable of performing object detection, recognition, etc., can be useful in a variety of applications including internet of things (IoT) applications.

As described herein, the dedicated CV computation hardware computes or is capable of computing CV features, or localized CV features for each sensor element or pixel in a sensor array unit, based on, at least in part, on signals associated with neighboring sensor elements. (Herein, the term "local" or "localized" refers to features computed based on one or more neighboring sensor elements rather than statistical or other mathematical evaluation of the entire image.) As described herein, the sensor elements including a subject sensor element and other sensor elements relatively close to the subject sensor element may be referred to as neighboring sensor elements. In certain aspects of the disclosure, the neighboring sensor elements may include the subject sensor element and sensor elements immediately adjacent to the subject sensor element. In certain other aspects of the disclosure, neighboring sensor elements may also include sensor elements that are relatively close to the subject sensor element and not immediately adjacent. For example, in certain instances, sensor elements within three sensor elements from the subject sensor element may still be considered neighboring sensor elements when the width or height of the number of sensors is sixty four sensor elements.

As described herein, CV features or localized CV features may refer to detecting low level computer vision markers or indicators, such as labels associated with each sensor element or pixel of the sensor. As indicated in further detail below, such CV features can include outputs such as a Histogram of Signed Gradients (HSG) and/or a Local Binary Pattern (LBP). An LBP calculation can be based on neighboring sensor elements, for example a reference or subject sensor pixel and its eight immediately-adjacent neighboring sensor pixels. The LBP calculation may score each of the reference pixel's immediately-adjacent neighboring pixels based on their respective difference in intensity. (Color would be dealt with using different LBPs for different color channels (e.g., red, blue, and green).) A HSG computation also employs neighboring sensor elements, for example a reference pixel and one or more immediately-adjacent neighboring pixels to detect various features within a scene.

For example, in the setup 100 of FIG. 1, the user 130 may have picked up the mobile device 105 while the mobile device's general-purpose microprocessor is in a sleep mode. The sensor system of the mobile device 105, however, may remain active and may be capable, for example, of recognizing the face of the user 130, a hand gesture, other objects in the scene, and/or the like. Upon recognizing a certain reference occurrence has taken place—in this case, the specific facial features of the user 130 are within the sensor system's field of view 110—the sensor system can send an event to the mobile device's general-purpose microprocessor indicating that the facial features of the user 130 have been recognized and/or causing the mobile device's general-purpose microprocessor to exit the low-power mode and become fully active.

Reference occurrences that cause the sensor system to send an event to the mobile device's general-purpose microprocessor can include any of a variety of CV-detectable occurrences, depending on desired functionality. These occurrences may include, for example, facial and/or object detection, facial and/or object recognition, gesture recognition, and/or the like. In some embodiments, one or more reference occurrences may be configurable by a user 130. Additional examples of reference occurrences are provided herein below.

Because the special-purpose camera is dedicated to the sensor system, it may not be primarily intended for clicking photographs or shooting videos. Therefore, the special-purpose camera may not yield intensity-based images out. Instead, the special-purpose camera may include pixel-level computer vision feature computations like LBPs, Gradients, Edges, HSGs, and/or other operations in which readings from neighboring sensor pixels of the special-purpose camera are used to compute CV features, for a low-power hardware-based computation of the said features.

That said, although a sensor system comprising a special-purpose camera may be used, embodiments are not so limited. More broadly, a sensor system can include a sensor array unit that includes sensor cells for sensing chemical, visual, aural, biological, mechanical, and/or other types of input.

Additionally, although FIG. 1 and other embodiments describe a sensor system being incorporated into a mobile device, embodiments are not so limited. Power savings brought by the techniques and features described herein can have particular benefit to mobile devices—such as mobile phones, tablets, laptops, portable media players, and/or the like—but other devices, such as televisions, desktop computers, and/or other devices that may not be generally considered mobile may utilize the features and techniques described herein.

Figure 2A:
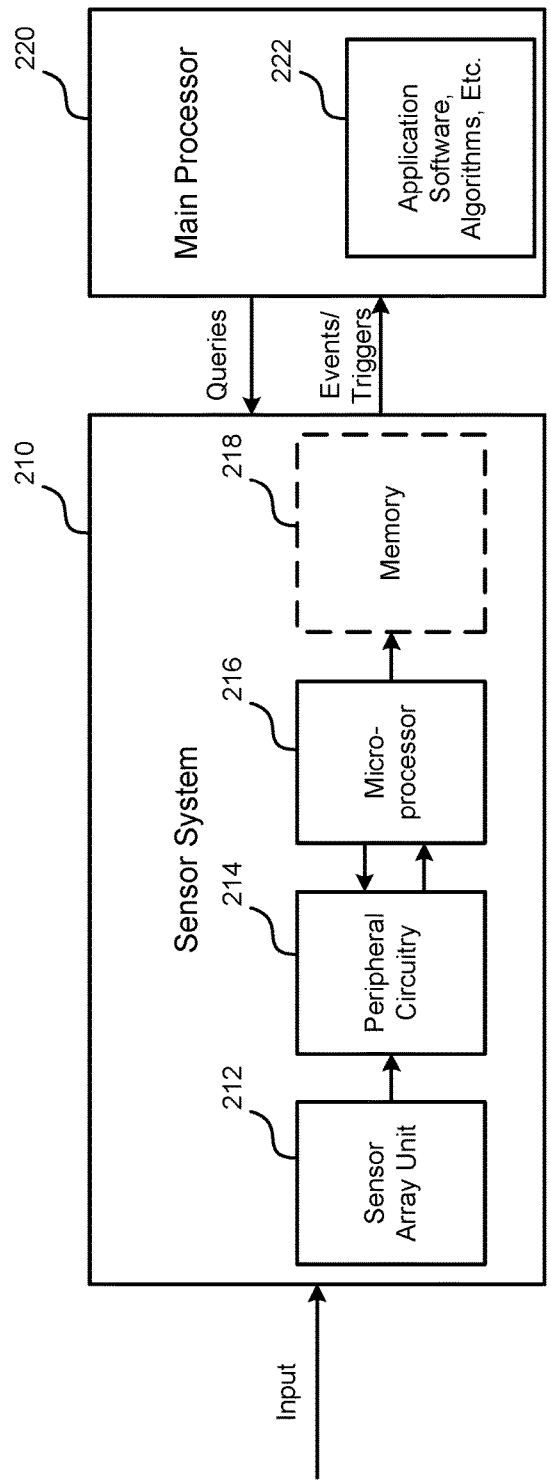
FIG. 2A is a block diagram of a configuration including a sensor system and main processor, according to one embodiment.

FIG. 2A is a block diagram that illustrates how a sensor system 210 (also referred to herein as a "smart sensor") can be configured to enable high-level sensing operations while a main processor 220 can be operating in a low-power (e.g., "sleep" or "stand-by") mode, according to one embodiment. Components of FIG. 2A can be incorporated into a larger electronic device. An example of a mobile device in which an sensor system 210 may be incorporated is described below, with regard to FIG. 5.

Also, it will be understood that alternative embodiments may vary from the components shown in FIG. 2A. For example, as described below, embodiments of a sensor system 210 may or may not include peripheral circuitry 214, a microprocessor 216, and/or memory 218. Additionally or alternatively, embodiments may combine, separate, add, omit, and/or rearrange the components of FIG. 2A, depending on desired functionality. For example, where the sensor system 210 comprises a sensor array (e.g., a pixel array or camera), some optics may be utilized to manipulate the input (e.g., light) before it reaches the sensor array. It is noted that, although embodiments herein describe the use of an "image array," embodiments are not so limited an may more broadly utilize a sensor array that does not necessarily produce or capture an image. (FIG. 2B, described in more detail below, illustrates a sensor system 210 with a sensor array unit 212, microprocessor 216, and example peripheral circuitry 214, according to one embodiment.)

As illustrated in FIG. 2A, an sensor system 210 receiving an input can comprise a sensor array unit 212, peripheral circuitry 214, microprocessor 216, and/or memory 218. The electronic sensor can be communicatively coupled through either a wired or wireless connection with a main processor 220 of an electronic device (such as an application processor of a mobile phone), which can provide queries to the sensor system 210 and receive events and/or other triggers from the sensor system 210. In some embodiments the "main processor" 220 may simply correspond to a larger, for example greater in processing power and/or greater in electric power use, processing unit than the microprocessor 216. In some implementations, microprocessor 216 can correspond to a dedicated microprocessor or a first processing unit and can be configured to consume less power than the main processor 220 which can correspond to a second processing unit.

The type of sensor array unit 212 utilized can vary, depending on the desired functionality of the electronic sensor. As previously indicated, an sensor array unit 212 can include an array (e.g., a one- or two-dimensional array) of sensor cells for sensing chemical, visual, aural, biological, mechanical, and/or other types of input. For example, the sensor array unit 212 can comprise a camera sensor or other vision and/or sensor array where the plurality of sensor cells forms a grid of pixels.

In some embodiments, the sensor array unit 212 may include a "smart" array, that includes some additional memory and/or logic circuitry with which operations on one or more outputs of the sensor cells may be performed. In some embodiments, each sensor pixel in the sensor array may be coupled with the memory and/or logic circuitry, which may or may not be part of the peripheral circuitry 214 (discussed in more detail below). The output of the sensor array unit 212 and/or peripheral circuitry may include outputs in addition or as an alternative to the raw sensor readings of the sensor cells. For example, in some embodiments, the sensor array unit 212 and/or peripheral circuitry can include dedicated CV computation hardware configured to receive image data from an sensor array of the sensor array unit 212 comprising more than one sensor pixel. CV features can then be computed or extracted by the dedicated CV computation hardware using readings from neighboring sensor pixels of the sensor array, providing outputs such as a computed HSG and/or an LBP feature, label, or descriptor. In some embodiments, no image signal processing circuitry may be disposed between the sensor array unit 212 and the dedicated CV computation hardware. Put differently, dedicated CV computation hardware may receive raw sensor data from the sensor array unit 212 before any image signal processing is performed on the raw sensor data. Other CV computations are also possible based on other CV computation algorithms including edge detection, corner detection, scale-invariant feature transform (or SIFT), speeded up robust features (SURF), histogram of oriented gradients (HOG), local ternary patterns (LTP), etc., as well as extensions of any of the above.

The synchronicity (or asynchronicity) of the sensor array unit 212 may also depend on desired functionality. In some embodiments, for example, the sensor array unit 212 may comprise a traditional (i.e., "frame-based") camera with readout circuitry timed to provide periodic sampling of each pixel based on certain timing requirements. In some embodiments, the sensor array unit 212 may comprise an event-driven array by which sensor output may be determined by when a sensor reading or other output reaches a certain threshold and/or changes by a certain threshold, rather than (or in addition to) adhering to a particular sampling rate. For a "smart" array, as discussed above, the sensor reading or other output could include the output of the additional memory and/or logic (e.g., an HSG or LBP output from a smart sensor array). In one embodiment, a smart sensor array can comprise a dynamic vision sensor (DVS) in which, for each pixel in the smart sensor array, a pixel value is asynchronously output when the value changes from a previous value by a threshold amount. In some implementations, the sensor array unit 212 can be a hybrid frame-event-driven array that reads values out at a given frame rate, but saves power by only reading out values for elements in the array that have changed since the previous read-out.

The peripheral circuitry 214 can also vary, depending on the desired functionality of the electronic sensor. The peripheral circuitry 214 can be configured to receive information from the sensor array unit 212. In some embodiments, the peripheral circuitry 214 may receive information from some or all pixels within the sensor array unit 212, some or all of the in-pixel circuitry of the sensor array unit 212 (in implementations with significant in-pixel circuitry), or both. For embodiments in which the sensor array unit 212 provides a synchronized output, for example, peripheral circuitry can provide timing and/or control operations on the sensor array unit output (e.g., execute frame-based and/or similar timing). Other functionality provided by the peripheral circuitry 214 can include an event-queuing and/or processing operation, analog processing, analog-to-digital conversion, an integration operation (e.g. a one- or two-dimensional integration of pixel values), CV feature computation, object classification (for example, cascade-classifier-based classification or histogram-based classification), or histogram operation, memory buffering, or any combination thereof, "pixel block value summation," "neighboring pixel value comparison and thresholding," "vector dot product computation," and the like. Means for performing such functionality can include, for example, peripheral circuitry 214, in various implementations. In some embodiments, the peripheral circuitry 214 is coupled to the sensor cell outputs of the sensor array unit 212 and does not include a microprocessor or other processing unit. Some examples of peripheral circuitry 214 are included herein below, with regard to FIG. 2B.

That said, some embodiments can further include a microprocessor 216 coupled to the output of the peripheral circuitry 214. The microprocessor 216 generally can comprise a processing unit that operates on relatively low-power, relative to the main processor 220. In some implementations, the microprocessor 216 can further execute computer vision and/or machine-learning algorithms (which can be frame- and/or event-based) using its own program (for example, software-based) and data memory. Thus, the microprocessor 216 is able to perform computer vision and/or machine learning functions based on input received by the sensor array unit 212 while the main processor 220 operates in a low-power mode. When the microprocessor 216 determines that an event requiring output to the main processor 220 has taken place, the microprocessor 216 can communicate an event to the main processor 220, which can bring the main processor 220 out of its low-power mode and into a normal operating mode.

Optionally, in some embodiments, the output of the microprocessor 216 may further be provided to memory 218 before being relayed to the main processor 220. The memory 218 may include working memory and/or data structures maintained by the microprocessor 216 on the basis of which events or triggers are sent to the main processor 220. Memory may be utilized, for example, in storing images, tracking detected objects, and/or performing other operations as discussed in more detail below with regard to FIG. 2B. Additionally or alternatively, memory 218 can include information that the main processor 220 may query from the sensor system 210. The main processor 220 can execute application software, algorithms, etc. 222, some of which may further utilize information received from the sensor system 210.

As previously noted, the ability of the sensor system 210 to perform certain functions, such as image processing and/or computer vision functions, independent of the main processor 220 can provide for vast power, speed, and memory savings in an electronic device that would otherwise have to utilize the main processor 220 to perform some or all of the functions of the sensor system 210. In particular, the combination, of the sensor array unit 212, peripheral circuitry 214, and microprocessor 216 allow scene understanding that is capable of detecting, in a dynamically changing scene captured by the image array, an occurrence.

In one example, a mobile phone having the configuration shown in FIG. 2A, can use facial detection to exit out of a standby mode. In this example, the mobile phone enters into a standby mode in which a display of the mobile phone is powered down, and the main processor 220 operates on a low-power, sleep mode. However, the sensor system 210 with an image array as the sensor array unit 212 continues to operate, processing data from the sensor array unit 212 as objects enter and exit the image array's field of view. When a face enters the field of view of the image array (such as in FIG. 1, when the face of the user 130 enters into the field of view 110 of the mobile device 105), it may be detected by the sensor array unit 212, the peripheral circuitry 214, the microprocessor 216, or any combination thereof. If the detected face remains in the field of view of the image array for a threshold period of time (e.g., 0.5 seconds, 1 second, 2 second, etc.), the microprocessor 216 can send an a facial-detection event to the main processor 220, indicating that a face detection has occurred. The main processor 220 and the display of the mobile phone can then switch back to normal operating mode.

As noted elsewhere herein, an event can be an indication that one or more reference occurrences have occurred. Put more generally, events can include data related to a reference occurrence. Depending on desired functionality, the data included in an event can be indicative of a detected reference object, location information related to the reference object, number of reference objects, movement associated with detected reference object, and the like. This data may be conveyed in any of a variety of ways. For example, in the case of object detection, an event can be a simply binary output where "0" means the reference object has not been detected, and "1" means the reference object has been detected.

An event may include information other than an indication that a reference occurrence has occurred. For instance, an event may also include some data associated with the reference occurrence. In some embodiments, an event may include an n-bit/byte message, or multi-field message, where each bit or field is mapped to a specific piece of data. For example, an event may include an output where the first bit/field indicates whether an object has been detected, the second bit/field indicates whether the object is moving or stationary, the third bit/field relates the location of the object (or location-related information, such as four corners of a minimal box bounding the object, or location of a corner of the object, etc.), the fourth bit/field relates how many objects are detected, etc. In general, the event could include any data, including the hardware-computed CV features, or the image, in any way associated with the reference occurrence, including measurements or computations related to the reference occurrence, above the mere reference occurrence.

Depending on desired functionality, the reference occurrence may include any of a variety of triggers, such as a face or other object detection event, gesture event, face and/or reference object detection and/or recognition, and the like. Face detection, which can be implemented using any of a variety of face-detection algorithms, can include the coming into view of a human face or a non-human animal face (e.g., dog, cat, or other pet), or the coming into view of a human body or non-human animal body. Such "coming into view" of an object can be a result of movement of the object and/or movement of the camera. A reference occurrence may go beyond facial detection to determine an emotion or other expression of a human face from an analysis of various facial features and/or position of those features indicative of the expression. Additionally or alternatively, a reference occurrence may include detection and/or recognition of additional objects and/or object movements, such as a coming into view of a human hand, a hand gesture, a coming into view of a reference object (such as a certain object, a logo, or other reference object), and the like. In some embodiments a sensor system 210 may be preconfigured to detect certain reference objects. Additionally or alternatively, an object for detection and/or recognition by the sensor system 210 may be selectable by a user and/or application executed by the main processor 220. A reference occurrence may include detected environmental changes, such as a change from an indoor environment to an outdoor environment, a reference movement, rapid movement in a scene (e.g., indicating a fall), motion toward an object (e.g., indicating a risk of collision), movement or objects in a scene indicating danger (e.g., a fire for fire detection), or any combination thereof. In some implementations, a reference occurrence may be related to, or based on, the detection of a reference object, as described in further detail below in FIG. 2B and elsewhere herein. In some implementations, once a reference object is detected in an image frame, the microprocessor 216 can check to see if the same object is subsequently detected in a subsequent image frame. The microprocessor 216 can use location information and other data associated with the detected object received from the peripheral circuitry 214, or generated by the microprocessor 216 itself, to determine the occurrence of the reference occurrence, which can be based on the detection of the reference object. Referring again to the example of facial detection in the previous paragraph, facial detection (reference occurrence) may take place if the detection of a face (reference object) remains in the field of view of the image array for a threshold period of time, resulting in a corresponding facial-detection event being sent to the main processor 220.

Figure 2B:
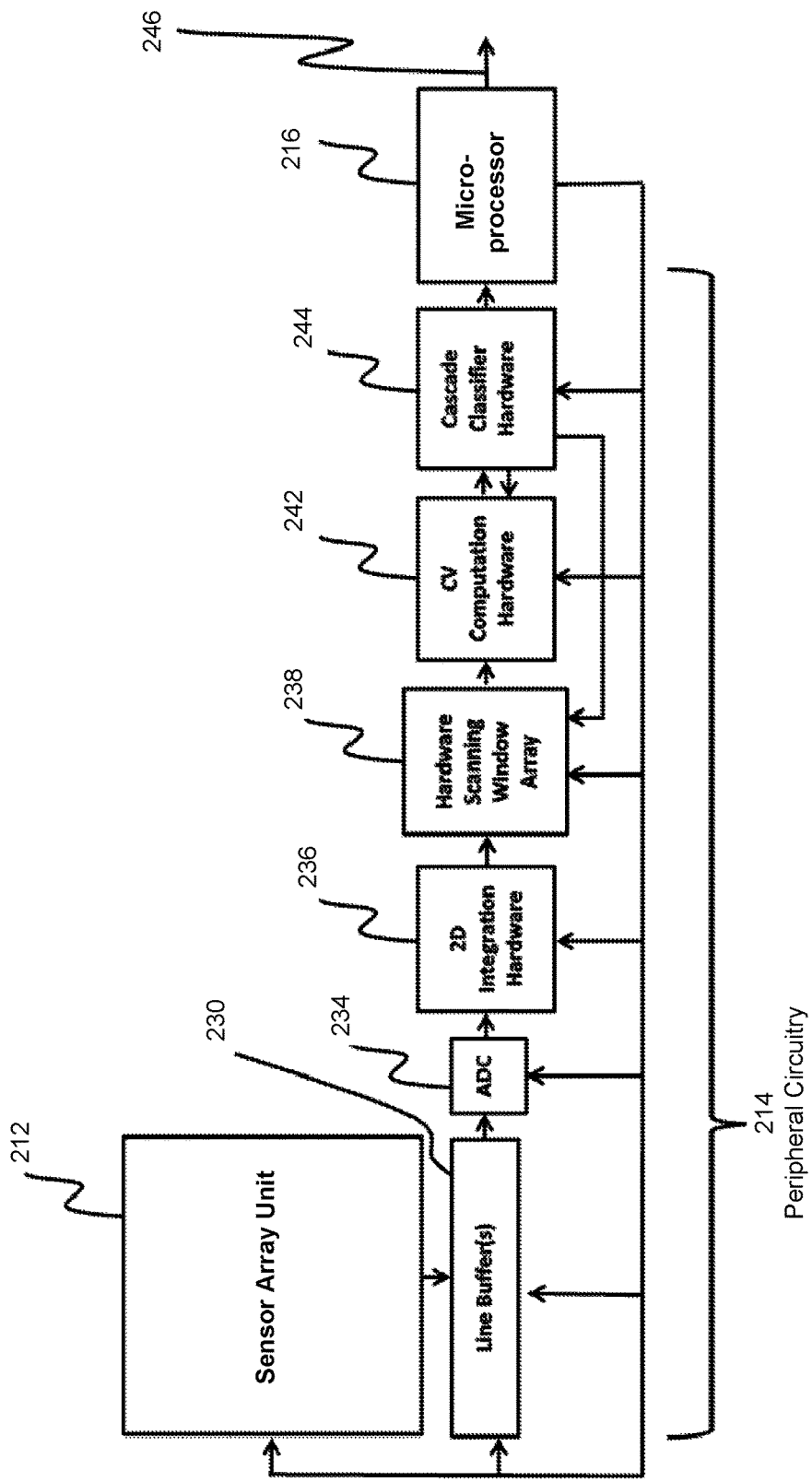
FIG. 2B is a block diagram of a sensor system with a sensor array unit, microprocessor, and example peripheral circuitry 214, according to one embodiment.

FIG. 2B illustrates an example implementation sensor system, such as the sensor system 210 of FIG. 2A, including a sensor array unit, CV computation hardware, and microprocessor that includes an interface for communication with a second microprocessor. The sensor array unit 212 may include a correlated double sampling circuit. The sensor array unit 212 may also include circuitry to combine, sum or average sensor element or pixel signals or values before outputting the signals to line buffer(s) 230, for example in implementations where CV computation is improved using combined pixel values or a lower resolution. Line buffer(s) 230 may include one or more line buffers to transfer signals representing the image or portions of the image out of the sensor array unit 212 to other portions of the vision sensor. In some implementations, the sensor element array 212, unlike more conventional sensor array units, may not include circuitry for image signal processing (ISP), and hence, FIG. 2B illustrates an implementation where the sensor array unit 212 and CV computation hardware 242 are connected without intervening ISP circuitry, hence, in some implementations, no ISP circuitry is disposed between the sensor array unit 212 and the hardware scanning window array 238 or dedicated CV computation hardware 242. For example, in some implementations, the signals received by the CV computation hardware 242 from the sensor array unit 212 have not undergone ISP, for example, the signals have not undergone one or more of defect correction, white balancing, color balancing, auto focus, lens roll off, demosaicing, debayering, or image sharpening, or any combination thereof. However, in some such no-ISP implementations, some processing may occur, such as focusing or auto-exposure correction. Such signals that have not undergone ISP may be referred to as raw signals or raw sensor readings or raw sensor data. Raw signals, raw sensor readings, or raw sensor data can be converted to digital, integrated to form an integral image, stored in a scanning window and dedicated CV computation hardware can be configured to receive the raw signals, raw sensor readings, or raw sensor data, even though it is understood that the raw signals, raw sensor readings, or raw sensor data has undergone some data manipulation (including summation or integration), but have not undergone ISP. In one implementation, the sensor array unit 212 is a Quarter Video Graphics Array (QVGA) camera sensor without ISP circuitry with the array comprising 216 by 240 sensor elements.

In various implementations, the CV computation hardware 242 can perform CV computations in either the digital or analog domain. Therefore, optionally, in digital implementations, an analog-to-digital converter (ADC) 234 may be disposed between the line buffer(s) 230 and the CV computation hardware 242. In some implementations, the CV computation hardware 242 is dedicated CV computation hardware in the sense that it is hardware designed to have little or no functionality other than to compute CV features, labels, or descriptors.

In some implementations, the CV computation hardware 242 may use combinations, sums, or averages of signals associated with blocks of sensor elements or pixels. In such implementations, an integral image can be useful in computing such combinations, sums, or averages prior to input into the CV computation hardware 242. For example, for summing more than four pixels (e.g., for blocks greater than 2×2, such as 3×3 or 11×11), summation can be much faster using an integral image since only four values need to be added or subtracted to determine the sum of pixel values in an integral image, rather than sum 9 or 121 values for respective 3×3 or 11×11 image blocks. Therefore, optionally, the vision sensor may also include two dimensional integration hardware 236 for computing an integral image of at least a part of the image based on at least a subset of the signals representative of the image sampled by at least a subset of sensor elements (e.g., pixels) in the sensor array unit. As illustrated, the two dimensional integration computation hardware 236 can be in communication with the dedicated CV computation hardware 242. As previously noted integral image representative of the image sampled by the sensor array unit and/or the integral image of a portion of the image sampled by the sensor array unit can be used to more quickly combine, sum, or average signal values for blocks of sensor elements compared to adding the signal values directly. Two dimensional integration hardware 236 can include circuitry capable of generating signals representative of the integral image of all or a portion of the image sampled by sensor array unit in either the digital or analog domains based on raw signals from the sensor array unit 212. In some implementations, the integral image (which may be an integral image of only a portion or sample window of the image sampled by the sensor array unit) generated by the two dimensional integration hardware 236 can be stored in a hardware scanning window array 238, as illustrated in FIG. 2B. For example, the hardware scanning window array may include a random-access memory (RAM) array or other form of analog or digital memory for storing the integral image. In implementations where computing combinations, sums, or averages of signals corresponding to blocks of sensor elements is not useful, such as pixel-level LBP, it is understood that the two dimensional integration hardware 236 may not be included, and hence a sample window including analog raw signals from the sensor array unit 230 or converted-to-digital raw signals from the ADC 234 may be stored directly in the hardware scanning window array 238. Furthermore, it is understood that in some implementations, two dimensional integration hardware 236 may also or instead perform one dimensional integration. Similarly, the hardware scanning window array 238 may store a one dimensional integral image corresponding to a sample window of the image captured by the sensor array 230. Use of one dimensional integral images can allow for the computation of multi-block LBP, for example, using rotated blocks in order to detect rotated reference objects, for example, faces. Optionally, a frame buffer (not illustrated) may be used before or after the two dimensional integration hardware 236. In implementations with a frame buffer disposed before the two dimensional integration hardware 236, the entire frame or image can be transferred from the sensor array unit 212 into the frame buffer. The two dimensional integration hardware 236 can then generate integral images of portions or windows of the image stored in the frame buffer and store such windows in the hardware scanning window array 238. Alternatively, the two dimensional integration hardware 236 can integrate the entire image and store the entire integral image in a frame buffer disposed between the two dimensional integration hardware 236 and the hardware scanning window array 238, in which case windows of the integral image stored in the frame buffer can be stored in the scanning window array 238. It is understood, however, that the frame buffer is optional and two dimensional integration hardware 236 can receive data corresponding to windows or portions of the image from the sensor array unit 212 and integrate the windows or portions one the fly and store such integral image windows in the hardware scanning window array 238.

The vision sensor may also include CV computation hardware 242. In some implementations, the CV computation hardware can compute a localized CV feature for a block of one or more subject sensor elements based on, at least in part, signals associated with a plurality of neighboring sensor elements in proximity to the block of sensor elements. For example, in a local binary pattern (LBP) implementation of CV computation hardware, CV computation hardware can include hardware that receives signal values corresponding to raw image signals—or combinations, sums, or averages of raw image signals (generated, for example, using an integral image)—and generates a digital LBP label or vector based on the raw image signals. In implementations where multi-block LBP is computed, the block of one or more subject sensor elements can include a block of m by n sensor elements, for example, 11 by 11 sensor elements. It is also understood that a pixel-level LBP computation may also be made where the block of one or more subject sensor elements for which the localized CV feature is computed is a single subject sensor element. Although the description above referenced CV computation hardware 312 as separate from the dedicated microprocessor 320, it is understood that in some implementations, dedicated CV computation hardware 312 may be implemented in hardware within the dedicated microprocessor 320.

Generating the CV features, such as the LBP labels discussed above, in dedicated hardware can reduce the power of the vision sensor compared to computing the CV features in a processor, for example a general purpose processor such as an application processor or even microprocessor 216. However, the vision sensor may still include a microprocessor 216 coupled to the CV computation hardware 242 to perform functions other than CV feature computation, such as CV-related operations or computations other than CV feature computation, or to perform additional CV feature computation relative to computations performed using CV feature computation hardware 242. The microprocessor 216 receives the hardware-computed CV features from the CV computation hardware 238 and can perform higher-level computer vision operations such as object-class detection (of which face detection can be regarded as a specific case, with other examples including upper torsos, pedestrians, and cars), in which the task is to find the locations and sizes of all objects in an image that belong to a given class, among other computer vision operations. Furthermore, the microprocessor 216 can provide control signals to the line buffer(s) 230, ADC 234, two dimensional integration hardware 236, hardware scanning window array 238, and CV computation hardware 242. In some implementations, to perform the object-class detection or other computer vision operations, the microprocessor 216 may use a cascade classifier algorithm to perform object-class detection, for example face detection. In an optional implementation, further power savings are possible by implementing the cascade classifier in hardware, to further reduce the computational burden on the microprocessor 216.

The optional cascade classifier hardware 244 includes a hardware implementation of a cascade classifier. In some implementations, the cascade classifier is trained using machine learning techniques on a data set of images including examples of the reference object the cascade classifier will be trained to detect or classify and examples of non-objects, for example images of faces and non-faces, or images of cars and non-cars, or images of upper torsos and non-upper torsos, etc. For example, in a first stage, the cascade classifier hardware may request the CV computation hardware 242 to compute LBP features for a certain number, l, of subject sensor elements stored in, for example, the hardware scanning window array 238. In addition, the location of the subject sensor elements, $\{(x_{11}, y_{11}), \ldots (x_{1l}, y_{1l})\}$, will also be provided by the cascade classifier hardware 244. Once the CV computation hardware 242 computes and provides the requested LBP features, which can be treated as vector values, the cascade classifier hardware performs a summation of a dot product of each of the LBP features with one or more weights to generate a first weighted scalar sum value. In general, each LBP feature, $(LBP_{11}, \ldots, LBP_{1l})$ will be multiplied by a given weight, $(w_{11}, \ldots, w_{1l})$, each of which can be different. The first weighted scalar sum value is then compared to a first threshold. If the scalar sum is less than the threshold, then to a given probability, there is no reference object in the portion of the image represented by the signals stored in the hardware scanning window array 238, and hence the cascade classifier hardware 244 sends a signal to the hardware scanning window array 238, and optionally to other components of the vision sensor, such as the line buffer(s) 230 and the sensor array unit 212, to indicate that the hardware scanning window array 238 should continue scanning and add one or more new columns and/or rows and remove one or more old columns and/or rows. With a subsequent window of the image, or a subsequent plurality of signals corresponding to a subsequent subset of sensor elements of the sensor array unit, stored in the hardware scanning window array 238, the process can begin anew. It is understood that the subsequent window of the image may overlap in large part with the previous window of the image. In some implementations, the image is scanned from left to right, and once the end of the sensor array unit 212 is reached, the image may be scanned again from left to right after moving down one or more rows. In another implementation, the image may be scanned from right to left after shifting down by one or more rows which may allow for an increased overlap with the prior image.

If the scalar sum is instead greater than the first threshold, then the cascade classifier hardware 244 moves to the next stage. In the next (in this example, second) stage, the cascade classifier hardware again requests the CV computation hardware 242 to provide LBP features for m subject sensor elements at locations $\{(x_{21}, y_{21}), \ldots, (x_{2m}, y_{2m})\}$ stored in the hardware scanning window array 238. Once the CV computation hardware 242 computes and provides the requested LBP features, $(LBP_{21}, \ldots, LBP_{2m})$, the cascade classifier hardware 244 performs another summation of a dot product of each of the LBP features with one or more weights, $(w_{21}, \ldots, w_{2m})$, to generate a second weighted scalar sum value. The second weighted scalar sum value is then compared to a second threshold. If the scalar sum is less than the second threshold, there is a low likelihood of a reference object being present in the portion of the image represented by the signals stored in the hardware scanning window array 238, and the cascade classifier sends a signal to the other components in the vision sensor array to continue scanning and move to a next portion of the image. If the second weighted scalar sum value is greater than the second threshold, the process continues to a third stage as described above. At the end of a final stage, for example an Nth stage in a N-stage cascade classifier, if the Nth weighted scalar sum value is greater than the Nth threshold, then a reference object is detected in the portion of the image stored in the hardware scanning window array 238. The cascade classifier hardware 244 can then indicate to the microprocessor 216 that the reference object has been detected, and may further optionally indicate the location of the portion of the image in which the reference object, or portion of reference object, was detected. In general, the cascade classifier hardware 244 can be configured to send an indication to the microprocessor 216 that the reference object was detected along with data associated with the reference object, such as the all or some of the CV features computed in the process of detecting the reference object, the location within the image of those CV features, or any other data associated with the computations or operations performed by the CV computation hardware 242 and/or the cascade classifier hardware 244.

The numbers and locations of subject sensor elements within the hardware scanning window array 238 for which LBP features, labels, or vectors is to be computed at each stage is generally programmed into the cascade classifier hardware 244 and result from the machine learning training discussed above. Similarly, the weights to multiply to each of the LBP features are also generally determined during machine learning training and then programmed into the cascade classifier hardware 244. The number of stages also results from the training, and is programmed into the cascade classifier hardware 244. In some implementations, a cascade classifier can include between 1 and 31 stages, for example, 15 stages. In some implementations, a cascade classifier can include between 1 and 31 stages, for example, 15 stages. Cascade classifier hardware 244 can, in some implementations, be considered dedicated cascade classifier hardware in the sense that it is hardware designed to perform the cascade classifier function and little to no other significant functions. While the implementation described above relates to a cascade classifier based on programmed weights and thresholds based on previous, in the laboratory, training and machine learning to generate a model, it is understood that cascade classifier hardware 244, or other hardware in peripheral circuitry designed to perform CV operations based on hardware-computed CV features received from CV computation hardware 242, can be designed to perform machine learning in the field.

In the implementations just described, the microprocessor 216 can then determine what to do with the, for example, reference object detected event. For example, it may send an event to a second microprocessor. In some implementations, the microprocessor 216 and the second microprocessor may correspond to microprocessor 216 and the main processor 220 of FIG. 2A. As illustrated in FIG. 2B, the microprocessor 216 includes an interface 246 for communications with the second microprocessor. Additionally or alternatively, the microprocessor 216 might track a position of the detected reference object over time (e.g., over multiple images) to determine movement for gesture recognition, risk of collision, danger, and/or other events, for example.

More generally, some embodiments can enable a wide range of functionality by first detecting an object then determining other features. On such embodiments, object detection may be made via peripheral circuitry (e.g., cascade classifier hardware 244 and/or other dedicated hardware), and additional operations may be performed by a microprocessor 216. For instance, a coming into view of an object may be determined first by detection of the object, then (e.g., using a microprocessor) a determination that the object has been in the camera's field of view for a threshold period of time. Gesture detection, as noted above, may be made by detecting a gesture-control object (e.g., a hand), then determining the movement of the hand. Risk of collision may be made by detecting an object and determining movement indicative of risk of collision with the object (e.g., by the camera, by a second object within the camera's field of view, etc.). A person of ordinary skill in the art will recognize that embodiments may include any combination of the features above, and/or variations on these features.

Although the description above referenced cascade classifier hardware 244 as separate from the microprocessor 216, it is understood that in some implementations, the cascade classifier hardware 244 may be implemented in hardware within the microprocessor 216. Also, cascade classifier hardware 244 can, in some implementations, be given some controlling functionality to allow it to, as illustrated, control CV computation hardware 242 and hardware scanning window array 238. As such, the cascade classifier hardware 242 can detect features autonomously from microprocessor 216, and hence microprocessor 216 can be in a low-power state while cascade classifier hardware 244 performs its functions. As such, the smart sensor can perform lower-power operations based on the one or more computed CV features, and when an object, for example, is detected, cascade classifier hardware 242 can provide an event, including data such as a sensor reading to the microprocessor 216, to awaken the microprocessor 216. Microprocessor 216 can then determine the next course of action, for example sending an event to a second microprocessor through interface 246. It is understood that even in the low-power state, microprocessor 216 can, in some implementations, still provide control signals to sensor array unit 212, line buffer(s) 230, etc., or, alternatively or additionally, such control signals may be provided by lower power control logic. Alternatively, a cascade classifier may be run as a software algorithm on the microprocessor 216. Furthermore, other software algorithms may be run on the microprocessor in the place of the cascade classifier. For example, reference object detection may be performed using histograms, as described in FIG. 11C. In some such implementations, a histogram of all LBP labels computed for a sample window of the image stored in the scanning window array 238 can be compared to a reference histogram to detect the presence of a face in the sample window stored in the scanning window array 238. In some implementations, dedicated hardware may be implemented to detect, for example, a face using histograms. Such an implementation may include such dedicated hardware in the place of, or in addition to, cascade classifier hardware 244.

In the implementation illustrated in FIG. 2B, one or more of the line buffer(s) 230, the ADC 234, the two dimensional integration hardware 236, the hardware scanning window array 238, the CV computation hardware 242, the cascade classifier hardware 244, or any combination thereof, may be considered peripheral circuitry, that is circuitry that is peripheral to the sensor array unit 212 and may correspond to peripheral circuitry 214 of FIG. 2A. It is also understood that the various components just listed, or any combination thereof, may be implemented instead as in-pixel circuitry within the sensor array unit 212.

Figure 3A:
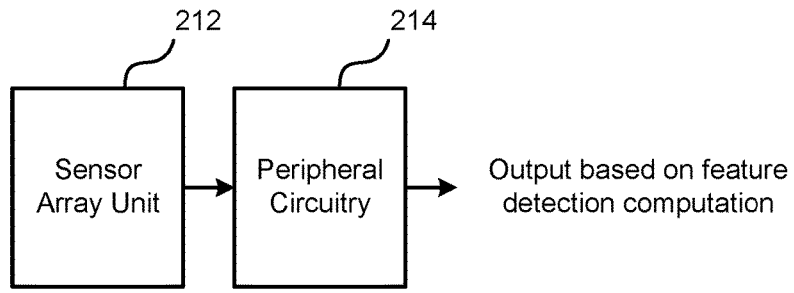
FIGS. 3A-3C are block diagrams illustrating how components of a sensor system can be utilized to provide low-power sensor processing, according to some embodiments.
Figure 3B:
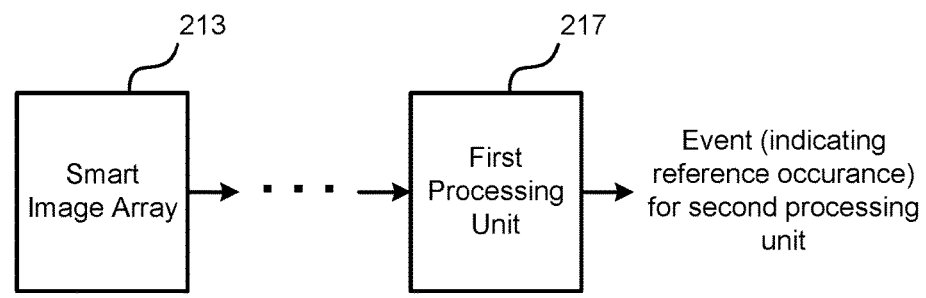
Figure 3C:
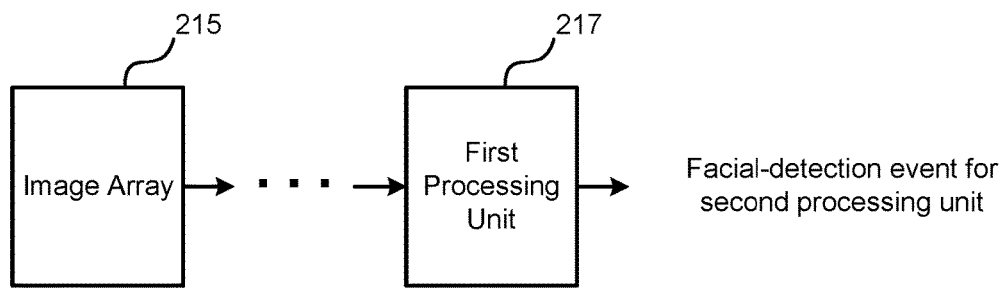

FIGS. 3A-3C are block diagrams illustrating how components of a sensor system 210 can be utilized to provide low-power sensor processing. Here, only certain components are illustrated. It will be understood that the sensor system may have additional components, as shown in FIGS. 2A and 2B.

In FIG. 3A, peripheral circuitry 214 is coupled with a plurality of sensor cell outputs of a sensor array unit 212. The sensor array unit 212 and/or peripheral circuitry 214 include dedicated CV computation hardware to perform a feature detection computation using at least a subset of the plurality of sensor cell outputs, where the subset of the plurality of sensor cell outputs correspond to a region of the sensor array unit 212 (e.g., an image array) comprising neighboring sensor cells or pixels. Thus, the output of the peripheral circuitry 214 is based (at least partially) on the feature detection computation. Such feature detection computation can include any of a variety of computations using neighboring sensor cells or pixels of the sensor array unit 212 that can provide for feature detection (e.g., edge detection, line detection, etc.). Such feature detection computations include, for example, LBP, HSG, and the like. In some embodiments, the dedicated CV computation hardware may comprise an integrated circuit.

In FIG. 3B, a first processing unit 217 is communicatively coupled with one or more outputs of a smart image array 213, in which multiple sensor pixels are coupled with memory and/or logic circuitry. Here, the first processing unit 217 may correspond to the microprocessor 216 of FIGS. 2A and 2B, and the smart image array 213 may correspond to the sensor array unit 212 of FIGS. 2A and 2B. The smart image array 213 may include dedicated CV computation hardware for computing CV features computed using readings from neighboring sensor pixels, as described above in regard to FIG. 3A and/or FIG. 2B. As shown in FIGS. 2A and 2B, these two components may not be directly coupled to each other, but may have intervening circuitry. The first processing unit 217 processes signals received from the one or more outputs of the smart image array to detect a reference occurrence. The first processing unit 217 then generates an event, indicating the reference occurrence, to be received by a second processing unit (e.g., the main processor 220 of FIG. 2A).

The event can be generated based on processing signals resulting from operations that are based on one or more computed CV features. Such operations can include, in some implementations, operations or computations performed by the cascade classifier (e.g., cascade classifier hardware 244 of FIG. 2B) to detect a face. The event being generated based on processing signals resulting from those operations may therefore include the microprocessor processing a signal, such as an indication from the cascade classifier, that a reference object was detected. The indication may include data associated with the detected object, such as the location, associated LBP features and their locations, and/or the image data itself. This enables the microprocessor to conserve energy by not analyzing image data when no reference object is detected.

In FIG. 3C, the setup is similar to FIG. 3B. Here, a first processing unit 217 is communicatively coupled with one or more outputs of an image array 215. Again, the first processing unit 217 may correspond with the microprocessor 216 of FIGS. 2A and/or 2B, and the image array 215 may similarly correspond with the sensor array unit 212 of FIGS. 2A and/or 2B. In this embodiment, however, the first processing unit 217 determines that a face has been detected and generates the face-detection event for a second processing unit. Depending on desired functionality, the first processing unit 217 may be operable to detect a face using the one or more signals received from the one or more outputs of the image array 215.

Figure 4:
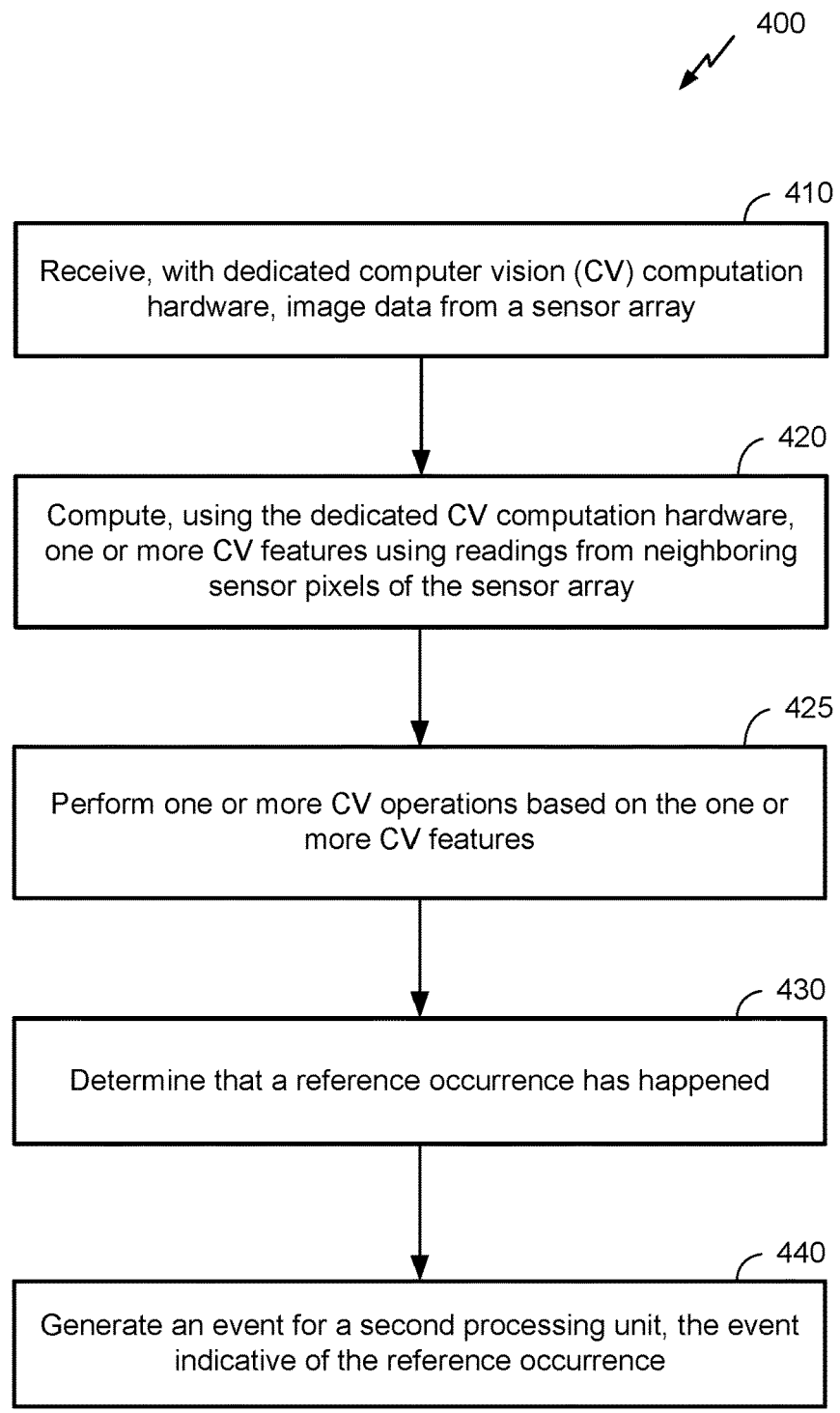
FIG. 4 is a flow diagram of a method of sensing dynamic scene-based occurrences, according to an embodiment.

FIG. 4 is a flow diagram illustrating a method 400 of sensing dynamic scene-based occurrences, according to an embodiment. As with other figures provided herein, FIG. 4 is provided as a non-limiting example. Alternative embodiments may include additional functionality to that shown in the figure, and/or the functionality shown in one or more of the blocks in the figure may be omitted, combined, separated, and/or performed simultaneously. Means for performing the functionality of the blocks may include one or more hardware and/or software components of an electronic device, such as one or more components of the mobile device illustrated in FIG. 5 and described below. A person of ordinary skill in the art will recognize many variations.

The method 400 can begin at block 410, where dedicated CV hardware receives image data from a sensor array. The image data can include sensor readings from a plurality of image pixels of the sensor array. As previously indicated, the dedicated CV hardware may be implemented in and/or incorporated into the sensor array unit 212 and/or peripheral circuitry 214 of FIG. 2A. (The sensor array can be included in the sensor array unit 212.)

At block 420, one or more CV features is computed by the dedicated CV computation hardware using readings from neighboring sensor pixels of the sensor array. Here, CV features can include edges, lines, and the like, which may be computed using, for example, LBP, HSG, and/or other computations. The usage of the dedicated CV computation hardware can enable quick and efficient computations without the need to use comparatively higher amounts of energy and/or processing power.

At block 425, one or more CV operations are performed based on the one or more CV features. As previously noted, such operations can occur in peripheral circuitry. For example, as described in relation to FIG. 2B a cascade classifier may perform operations to detect a face or other object, and provide a signal indicative of the detection of the face or other object to a microprocessor. As noted below, however, performing CV operations based on one or more CV features can be performed by either or both peripheral circuitry (e.g., dedicated hardware) and/or a microprocessor. The hardware and/or software components performing the CV operations can produce output signals (e.g., an output of a cascade classifier, signals indicating the LBP computations received directly from the CV computation HW, signals internally generated within the microprocessor, etc.). The microprocessor may use one or more of these signals to determine a reference occurrence (e.g., face detection) has happened.

At block 430, it is determined that a reference occurrence has happened. As indicated previously, a reference occurrence can include one or more of a variety of events. These can include, for example, a coming into view of a human face, an emotion expressed on a human face, coming into view of an non-human animal face, coming into view of a human hand, a hand gesture, a coming into view of a reference object, a change from an indoor environment to an outdoor environment, a reference movement, rapid movement in a scene indicating a fall, motion toward an object indicating a risk of collision, movement or objects in a scene indicating danger, or any combination thereof. In some embodiments, these reference occurrences may be predefined and/or user configurable.

At block 440, an event for a second processing unit is generated, where the event is indicative of the reference occurrence. As used herein, the term "event" describes information provided to a processing unit, indicative of a reference occurrence. Here, the event is provided to a second processing unit. In some embodiments, the event may simply include an indication that a reference occurrence has happened. In some embodiments, the event may further include an indication of the type of reference occurrence that was detected. The event may be generated by the first processing unit and sent to the second processing unit. In some embodiments, there may be intervening circuitry between the first and second processing units.

It can be noted that the functionality performed by the various blocks illustrated in FIG. 4 can be performed by various components of a sensor system (e.g., sensor system 210 of FIGS. 2A and 2B), depending on desired functionality. The functionality of block 410 and 420, for example, may be performed by in-pixel or peripheral circuitry (e.g., CV computation hardware). The functionality of block 425, for example, may be performed by a microprocessor or dedicated hardware (e.g., a cascade classifier or other dedicated hardware). In some embodiments, the functionality of blocks 425, 430, and 440 may all be performed by a microprocessor. Alternatively, some embodiments may perform the functionality of block 425 with peripheral circuitry, and the functionality of blocks 430 and 440 with a microprocessor. A person of ordinary skill in the art will recognize several variations.

Referring again to FIG. 2A, embodiments of the sensor system 210 described herein can further perform different types of functions, such as lower-power operations and higher-power operations, which relate to power or energy consumption used in respective lower-power and higher-power modes. In the higher-power mode, for example, the sensor system may provide image processing capabilities within the sensor system 210 itself by utilizing dedicated CV computation hardware as described herein. It is understood that the use of "lower-power" and "higher-power" herein is intended to be relative. In other words, even in the higher-power mode, the sensor system described may still be capable of performing powerful CV-based computations based on hardware-computed CV features using less power than performing those same CV-based computations with a microprocessor running CV algorithms in software. As detailed previously, dedicated CV computation hardware can include in-pixel circuitry integrated into the sensor array unit 212, which may include circuits for some or all pixels, capable of performing processing on each respective pixel, such as detecting a sensed light intensity relative to one or more neighboring pixels, detecting edges of objects based on differences in colors or intensities of sensed light with respect to neighboring pixels, and/or making LBP, HSG, and/or other CV computations. Dedicated CV computation hardware can further include peripheral circuitry 214, which can be used in addition or alternatively to in-pixel circuitry to perform some or all of these computations. Embodiments may disable, or otherwise operate in a low-power mode, some or all of this dedicated CV computation hardware of the sensor system 210 when higher-power operations are not needed, which can save power. Thus, as described herein, higher-power operations involve dedicated CV computation hardware (e.g., in-pixel circuitry in the sensor array unit 212 and/or peripheral circuitry 214), whereas lower-power operations are performed when some or all of the dedicated CV computation hardware is disabled or in a reduced-power state.

In one example, the sensor system 210 can configure the sensor array unit 212 to operate as a single pixel. In such a case, the sensor system 210 can disable all in-pixel circuits and/or and peripheral circuitry 214. In such a configuration, each of the individual pixels of the array contribute to a single sensed value for the entire sensor array.

Figure 5:
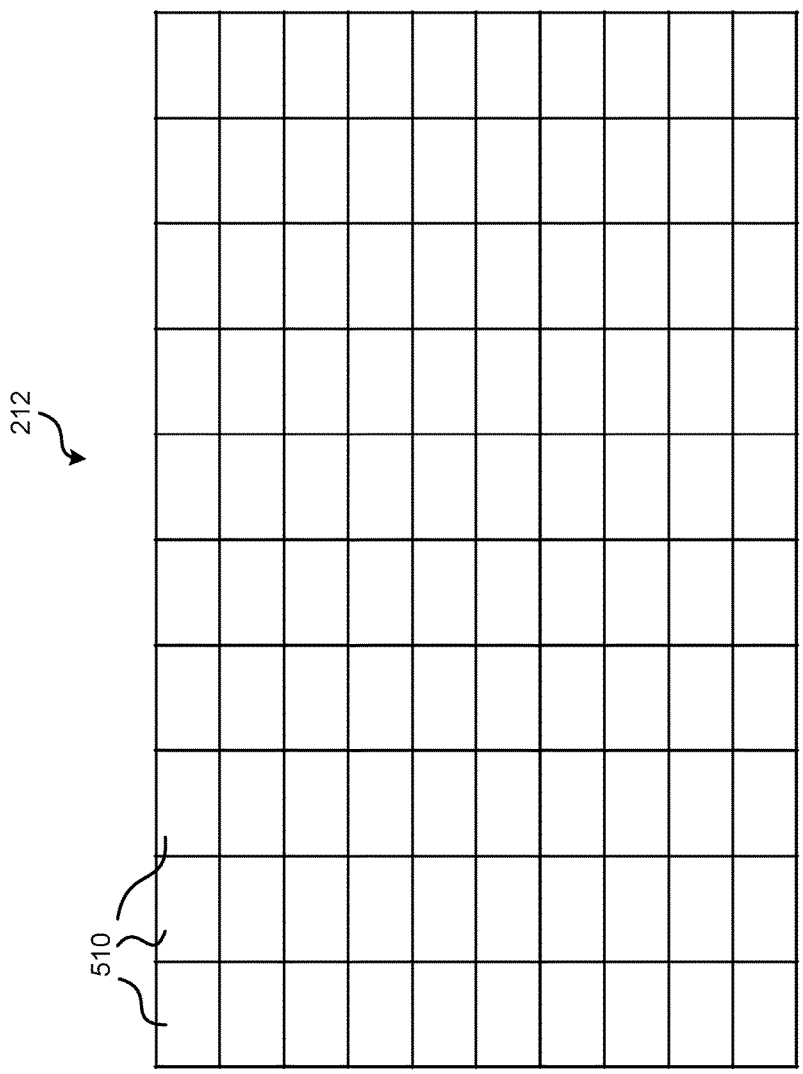
FIG. 5 is a simplified illustration of an example sensor array.

FIG. 5 shows a simplified illustration of the sensor array unit 212 of FIG. 2A. In the sensor array unit 212, pixels 510 are arranged in rows and columns and placed in the focal plane of a receiving optics to provide image capture. (For clarity, only a few pixels 510 in FIG. 5 have numerical labels.) It will be understood that features of the sensor array unit such as pixel size, aspect ratio, resolution, and the like can vary depending on desired functionality. For instance, the simplified illustration of FIG. 5 shows a 10×10 pixel array, but embodiments may have hundreds, thousands, or millions of pixels (or more).

As previously indicated, each pixel 510 may include a sensor as well as in-pixel circuitry to perform CV calculations for the pixel 510. Additionally or alternatively, peripheral circuitry may be included to perform CV calculations for the pixel, as indicated elsewhere herein. Continuing with the example above, one or more components in in-pixel circuitry of the sensor array unit 212 and or peripheral circuitry may be disabled to enable the sensor array unit 212 to perform lower-power operations in a power efficient manner to, for example, turn of all but one pixel, or read and combine sensed values from all pixels to effectively operate as only a single pixel, referred to as a "single-pixel mode." In this configuration, the sensor system 210 is configured to perform one or more lower-power operations, such as ambient light sensing (ALS), proximity detection (PD), proximity to a reference object detection, or motion detection. In some cases each of these functions may be adequately performed using a sensor array having only a single pixel.

Figure 6:
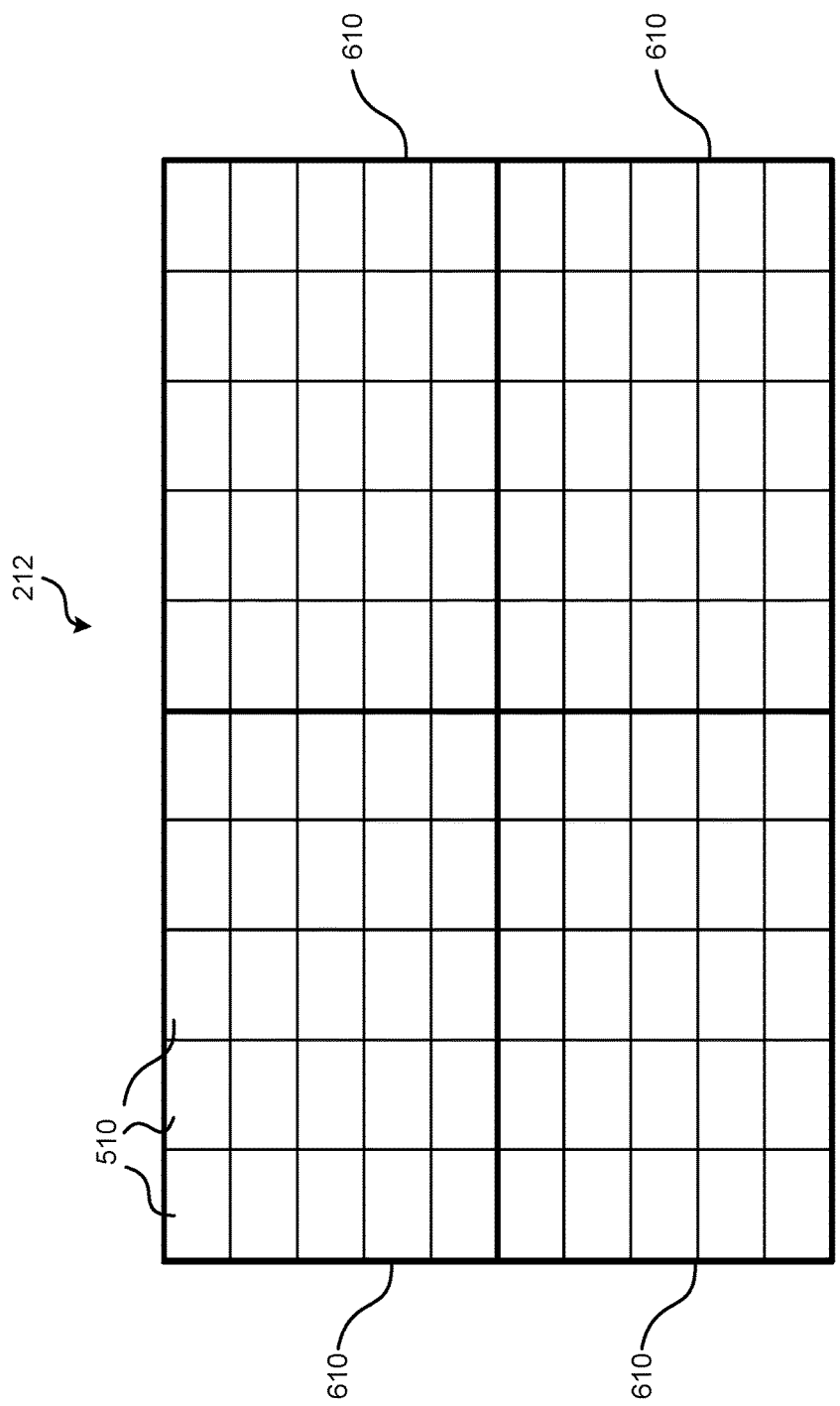
FIG. 6 is a simplified illustration of an example configurations of the sensor array of FIG. 5.

Additionally or alternatively the sensor array unit 212 may enable in a lower-resolution configuration in which, rather than effectively operating as only a single pixel, the sensor array unit 212 may operate as a plurality of pixels. As shown in FIG. 6, subgroups 610 of pixels 510 of the sensor array unit 212 can each operate in a manner similar to the single-pixel mode described above, thereby effectively operating as a sensor with multiple pixels (in the configuration of FIG. 6, the four subgroups 610 effectively form a 2×2 pixel array). Again, for example, some or all of the dedicated CV computation hardware of the sensor system 210 (e.g., peripheral circuitry 214 and/or in-pixel circuitry of the sensor array unit 212) can be disabled during this mode. In this configuration, the sensor system 210 may perform one or more lower-power operations, such as ALS, PD, change detection (CD), or motion detection. And while the example of FIG. 6 employs an apparent resolution of 2×2 pixels, other reduced resolutions may be configured. Again, such reduced resolutions may include aggregating multiple individual pixels 510 to operate collectively as a fewer number of pixels, or may include disabling one or more of the pixels 510 in the sensor array unit 212 such that the pixel does not sense light or does not provide an output while it is disabled.

As with the operations described in relation to FIGS. 3A-3C, the sensor system 210 may be configured to detect one or reference occurrences and generate one or more corresponding events while it is performing in a lower-power operation. For example, the sensor system 210 may be incorporated into a mobile phone and configured to detect a reference occurrence when a sensed value for the single pixel 310 indicates a significant increase in an amount of light detected by the sensor system 210. Such a change in the amount of detected light may indicate that the mobile phone has been retrieved from a user's pocket or has been picked up from a table or nightstand. The sensor system 210 can determine, while in lower-power operation, that this reference occurrence happened and generate an event indicative of the reference occurrence for the main processor 220. Upon detecting this event, the sensor system 210 can further activate dedicated CV computation hardware to enable higher-power operation to perform different types of CV operations, such as face detection and face recognition.

Figure 7:
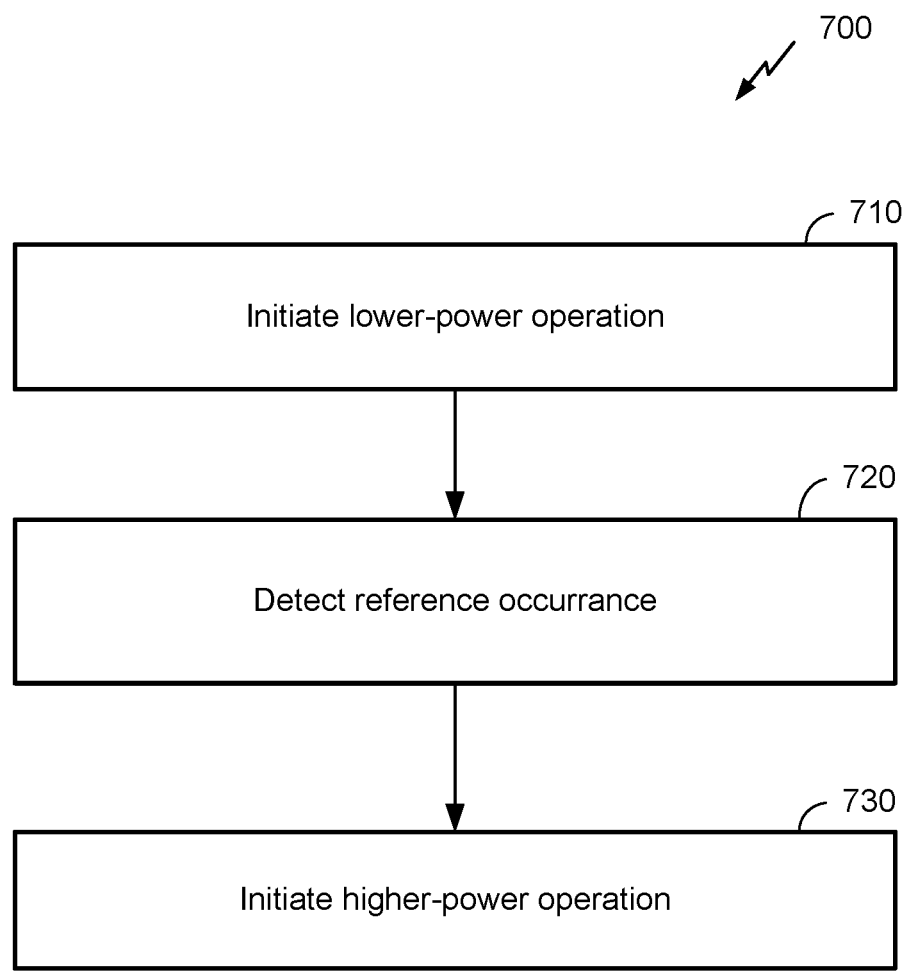
FIGS. 7-9 are flow diagrams illustrating example methods for using a sensor system for computer vision computations and lower-power optical sensor readings.

FIG. 7 is a simplified flow diagram illustrating an example method 700 for using a sensor system as an optical sensor. As with other figures provided herein, FIG. 7 is provided as a non-limiting example. Additionally, the method 700 may apply broadly to embodiments described herein, including the method 400 of sensing dynamic scene-based occurrences shown in FIG. 4. Means for performing the functionality of the blocks illustrated in FIG. 7 may include one or more hardware components of the sensor system, such as the sensor system 210 of FIG. 2A. In some embodiments, means may further include a main processor, such as the main processor 220 of FIG. 2A. And although the method 500 is described below as being performed by the sensor system 210 of FIG. 2A, embodiments are not limited to such a sensor system.

The method 700 can begin at block 710 when the sensor system 210 initiates a lower-power operation. For example, in one aspect, the sensor system 210 initiates one of an ALS operation, a PD operation, CD operation, or a MD operation. In this aspect, the sensor system 210 initiates the lower-power operation by disabling dedicated CV computation hardware, and configures the sensor array unit 212 to operate at a reduced resolution. As discussed above, in different examples, the reduced resolution may include a single-pixel mode. In some embodiments, the sensor system 210 may initiate a plurality of lower-power operations, such as both an ALS operation and a PD operation, a CD operation and MD operation, or all four of an ALS operation, a PD operation, CD operation, and a MD operation. After initiating the lower-power operation, the method 700 proceeds to block 720.

At block 720, while performing the lower-power operation, the sensor system 210 detects a reference occurrence. In one example in which the sensor system 210 is configured to perform an ALS function, the sensor system 210 generates at least one lower-power optical sensor reading, which may be used to detect the reference occurrence. For example a lower-power optical sensor reading may indicate a change in an amount of ambient light, and the sensor system 210 may detect a reference occurrence based on the lower-power optical sensor reading when a sensed level of light changes at a rate above a reference threshold, or changes color at a rate above a reference threshold.

In another example, the sensor system 210 is configured to perform a PD function. In this example, the sensor system 210 further comprises a light emitter, such as a light emitting diode (LED), and the sensor array unit 212 is configured to detect an amount of reflected light. When the amount of detected reflected light exceeds a threshold, the sensor system 210 detects a reference occurrence. For example, the sensor system 210 may detect a reference occurrence indicating an object is near the sensor system 210. In one aspect, when the amount of detected reflected light is below a threshold, the sensor system 210 may detect a reference occurrence. For example, the sensor system 210 may detect an event that an object is no longer near the sensor system 210.

In one example, the sensor system 210 is configured to perform a CD function. Change detection can detect a change in the scene that exceeds a threshold where such a scene change corresponds to a reference occurrence, for example, as described in block 720 of FIG. 7. With reference to FIG. 2B, in some implementations, hardware scanning window array 238, CV computation hardware 242, cascade classifier 244, and/or dedicated microprocessor 216, or any combination thereof, may be disabled or in a low-power mode. As used here, disabled is intended to indicate that such components are in a reduced power state as their functionality is either not being utilized or their functionality is drastically reduced compared to their normal operation. Therefore, in such a state, the sensor system can operate in a lower-power mode compared to normal operation involving CV feature computation and subsequent CV operations. Pixel values for large blocks of pixels in the sensor array unit 212, for example as illustrated in FIG. 6 blocks corresponding to subgroups 610, can be summed to get a single value representing all pixel values in each block. Such a summation can be computed using an integral image provided by the two-dimensional integration hardware 236 and stored, for example, in an integral image frame buffer (not shown in FIG. 2B). The block summations can then be compared from frame to frame in time. In a given block, if the change in the summation value from a current frame compared to a previous frame is greater than a reference change threshold, then a scene change reference occurrence can be detected. In an alternative implementation, a scene change reference occurrence will be detected only if a reference minimum number of blocks register such a change. For example, in a system with the sensor element array divided into 81 blocks (pixels are grouped into a 9 by 9 array, where each block in the 9 by 9 array includes a subarray of pixels), change in each block can be detected as described above, and a scene change reference occurrence may only be triggered if three, four, or another number of blocks register a change. Upon detecting the scene change, the sensor system 210 can further activate any combination of hardware scanning window array 238, CV computation hardware 242, cascade classifier 244, and/or dedicated microprocessor 216. It is understood that CD operation described above may be implemented without the use of an integral image or two-dimensional integration hardware, but may use other hardware to determine the summed block values.

In one example, the sensor system 210 can be configured to perform a MD function. In this example, the sensor system 210 configures the sensor array unit 212 to have a reduced resolution greater than a 2×2 pixel resolution, but less than a maximum resolution of pixels in the sensor array unit 212. In this example, the sensor system 210 is configured to detect relative changes in sensed light at different effective pixels. In such an example, the sensor system 210 analyzes an amount of light sensed at each of the effective pixels (e.g., subgroups 610 as shown in FIG. 6), determines a first set of differences between the amount of light sensed at each effective pixel relative to at least one other effective pixel. The sensor system 210 then detects a second amount of sensed light at each of the effective pixels, and determines a second set of differences between the amount of light sensed at each effective pixel relative to at least one other effective pixel. The sensor system 210 then determines a change in the differences based on the first set and the second set. The sensor system 210 detects a reference occurrence if the change in the differences exceeds a reference motion threshold. In one aspect, the sensor system 210 may detect a motion event if a first effective pixel indicates a positive change in sensed light relative to a second effective pixel, and subsequently the first effective pixel indicates a negative change in sensed light relative to a second effective pixel.

The detection of the reference occurrence at block 720 can then trigger the initiation of at least one higher-power operation. In block 730, the sensor system 210 initiates a higher-power operation by enabling dedicated CV computation hardware. For example, the sensor system 210 may initiate a face detection operation or a face recognition operation, or a gesture recognition operation. Alternatively, the sensor system 210 may initiate an object detection operation to detect the presence of a reference object in the images captured by the sensor system 210.

In situations where the reference occurrence that triggers the higher-power operation is a PD operation, detection of a reference object in images captured by the sensor system 210 could indicate the proximity of the reference object. Thus, in this example method, the higher-power operation is based on a one-way dependence relationship between the lower-power operation and the higher-power operation. The one-way dependence relationship in this example relates to the higher-power operation only occurring after the lower-power operation detects a reference occurrence.

Further, the higher-power operation may be based on evaluating the at least one lower-power optical sensor reading. For example, as discussed above, the sensor system 210 may perform a lower-power ALS operation and initiate a higher-power operation. In some examples, the higher-power operation may also evaluate the sensor reading from the lower-power ALS operation. For example, a higher-power operation may include a face detection or recognition function. In one aspect, the sensor system 210 may evaluate the ALS sensor reading to determine an ambient light level and adjust an exposure time or an aperture size when performing the face recognition function. Or in some aspects, a PD function may generate a sensor reading that a higher-power operation may evaluate to determine an estimated range to a detected object. In some aspects, the sensor system 210 may initiate other or multiple higher-power operations. In some aspects, the sensor system 210 may repeatedly execute the method 700. For example, after performing a higher-power operation, the sensor system 210 may restart the method 700 and perform the functionality at block 710 by initiating a lower-power operation. Upon detecting the scene change, for instance, the sensor system 210 can further activate any combination of additional components (e.g., hardware scanning window array 238, CV computation hardware 242, cascade classifier 244, and/or microprocessor 216) to perform one or more higher-power operations. The sensor system 210 may then revert back to a lower-power mode once the higher-power operations are performed.

While the method 700 of FIG. 7 has been described as a sequence of lower-power and higher-power operations, in some examples, the sensor system 210 may substantially simultaneously perform both lower-power and higher-power operations. For example, at block 730, after performing the higher-power operation, the sensor system 210 may initiate a lower-power operation but continue to perform higher-power operations. Thus, in some examples, at block 710, while the sensor system 210 is performing a lower-power operation, the sensor system 210 may also be performing additional functions, such as higher-power operations, and by initiating a lower-power operation, the sensor system 210 may not be exclusively performing lower-power operations. Further, when the sensor system 210 initiates a higher-power operation at block 730, the sensor system 210 in some examples may continue to perform lower-power operations.

Figure 8:
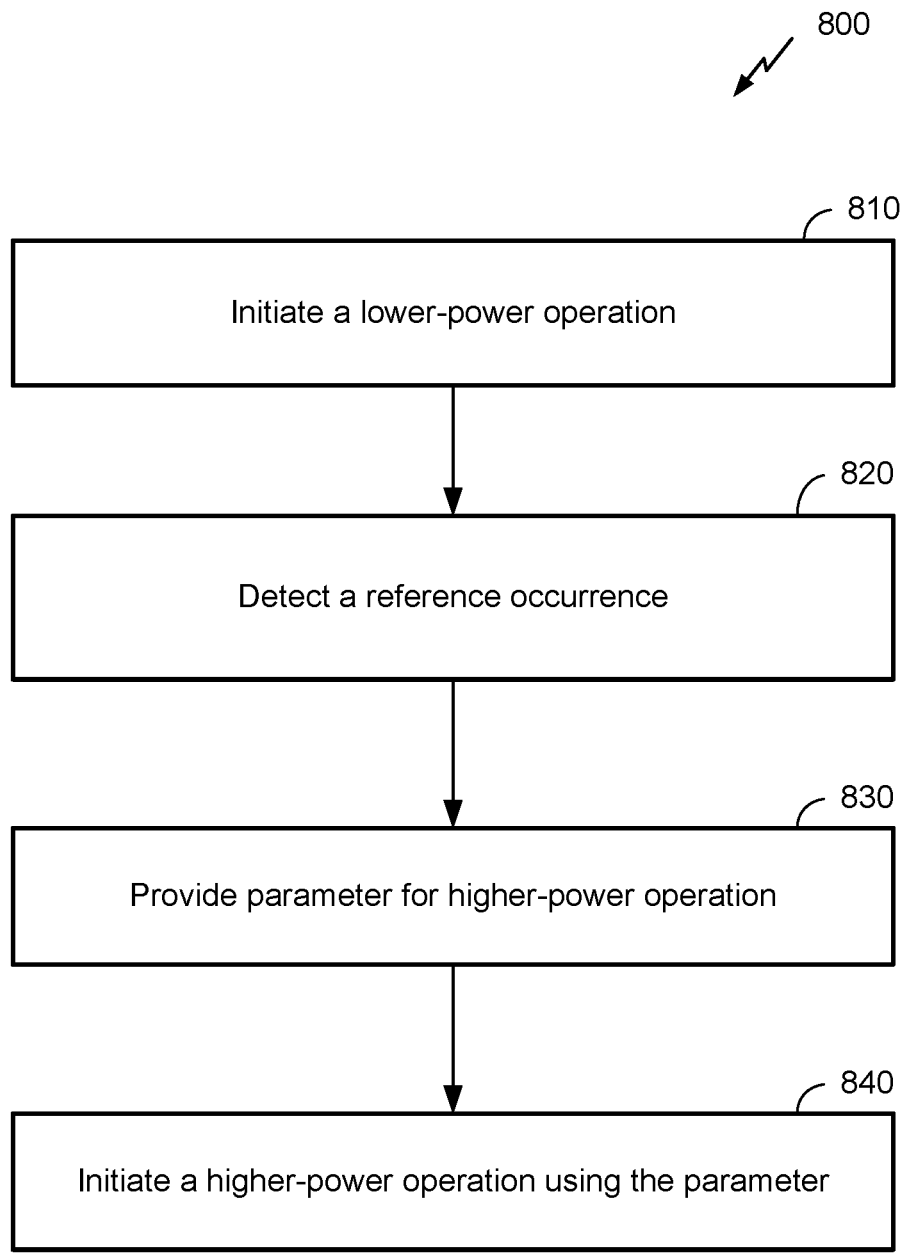

FIG. 8 shows an example method 800 for using a sensor system as an optical sensor. Again, the method 800 will be discussed with respect to the example sensor system 210 shown in FIG. 2A, but is not limited to such a sensor system.

The method 800 begins at block 810, where the sensor system 210 initiates a lower-power operation as discussed above with respect to the method 700 of FIG. 7. At block 820, while performing the lower-power operation, the sensor system 210 detects a reference occurrence as discussed above with respect to the method 700 of FIG. 7. After detecting the reference occurrence, the method 800 proceeds to block 830.

At block 830, the sensor system 210 provides a parameter value for a higher-power operation. In one example, the sensor system 210 provides a level of ambient light as a configuration setting for a higher-power operation. In this example, the sensor system 210 may provide the parameter value as a configuration setting associated with a light intensity or auto-exposure parameter, or with an integration time for an image. In another example, the sensor system 210 provides an estimated distance to an object. In one such example, if the sensor system 210 performed a PD operation and detected an object, the sensor system 210 provides an estimated distance to the object or an amount of detected reflected light. In another example, the sensor system 210 provides a direction of motion to a higher-power operation. In one such example, the sensor system 210 may be configured to perform a lower-power MD operation and/or movement of a block registering change (see discussion of CD, above) and detect a direction of motion based on changes in relative amounts of sensed light over time. The direction of motion may be provided to a higher-power operation, such as a gesture detection operation.

In some embodiments, the sensor system 210 may be configured to provide a parameter that indicates whether a scene viewed by the sensor system 210 is likely an indoor scene or an outdoor scene. For example, if a level of ambient light is above a pre-defined threshold, the sensor system 210 may provide a parameter indicating that the scene is an outdoor scene, while if the ambient light is below a second pre-defined threshold, the sensor system 210 may provide a parameter indicating that the scene is an in scene. In some examples, an indoor/outdoor determination may be made based on a peak intensity detected at one or more frequency.

In some embodiments, the sensor system 210 may be configured to provide a parameter indicating a region of interest in the scene. In one example, the sensor system 210 has configured the sensor array unit 212 to operate in a reduced resolution of 3×3 effective pixels. In such an example, the sensor system 210 may determine an effective pixel of interest, which may be based on detected changes in ambient light, a proximity detection reference occurrence, change detection in one or more of the effective pixels, and/or a detected direction of motion. In one example, the sensor system 210 may be configured to provide a parameter associated with a reference occurrence frequency. In this example, the sensor system 210 detects multiple occurrences of an event and determines a frequency at which the event occurs.

According to some embodiments, a parameter may be used to determine a higher-power operation. In one example, a parameter may indicate a CV feature selection operation. For example, the parameter may indicate whether to use an LBP function, an HSG function, or a CV function based on intensity of light. After the sensor system 210 provides the parameter, the method proceeds to block 840.

At block 840, the sensor system 210 initiates a higher-power operation using the parameter (provided at block 830) as discussed above.

As discussed above with respect to the method 700 of FIG. 7, while the method 800 of FIG. 8 has been described as a sequence of lower-power and higher-power operations, in some examples, the sensor system 210 may substantially perform both lower-power and higher-power operations simultaneously. For example, at block 840, after performing the higher-power operation, the sensor system 210 may initiate a lower-power operation but continue to perform a higher-power operation. Thus, in some examples, at block 810, while the sensor system 210 is performing a lower-power operation, the sensor system 210 may also be performing additional functions, such as higher-power operations, and by initiating a lower-power operation, the sensor system 210 may not be exclusively performing lower-power operations. Further, when the sensor system 210 initiates a higher-power operation at block 840, the sensor system 210 in some examples may continue to perform lower-power operations. Here, rather than disabling dedicated CV computation hardware to perform lower-power operations, the sensor system 210 may continue to operate with the dedicated CV computation hardware enabled. However, the lower-power operations may simply not utilize the dedicated CV computation hardware.

Figure 9:
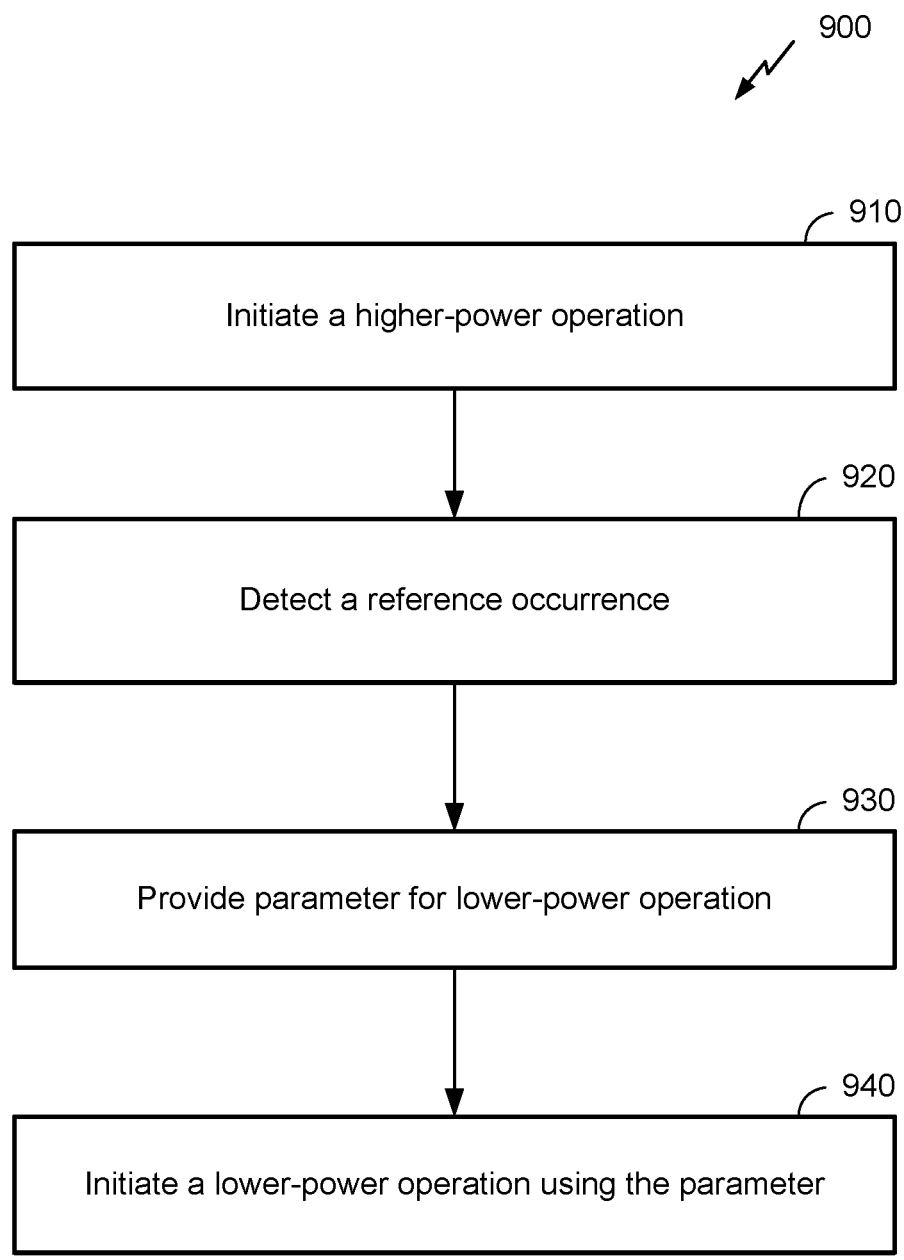

FIG. 9 shows an example method for using a sensor system as an optical sensor. As with other methods described herein, the method 900 will be discussed with respect to the example sensor system shown in FIG. 2A, but is not limited to such a sensor system.

The method 900 begins at block 910, where the sensor system 210 initiates a higher-power operation as discussed above. At block 920, the sensor system 210 detects a reference occurrence, such as face detection or face recognition, based on the higher-power operation at block 910. After detecting the reference occurrence, the method 900 proceeds to block 930.

At block 930, the sensor system 210 provides a parameter for lower-power operation. In one embodiment, a higher-power operation may detect an object near the sensor system 210, and in some example systems may also determine an estimated distance to the object. The sensor system 210 may provide an event comprising a parameter to the lower-power operation indicating the presence of the object, or may also (or instead) provide a parameter indicating a distance to the object. Such a parameter may be employed by the lower-power operation to assist with or enhance a PD function. For example, the PD function may be able to more accurately detect an object near the sensor based on the parameter, such as by establishing or adjusting a threshold intensity level.

In some embodiments, the sensor system 210 can provide a parameter indicating a direction to a light source. For example, a higher-power operation may detect an illuminated object or a reflective object, and a location or a direction to the object. The sensor system 210 may provide a parameter based on the higher-power operation indicating a direction to the light source. The lower-power operation may employ this parameter, for example when performing ALS. In one example, the higher-power operation may determine that a scene viewed by the sensor system 210 is an indoor or an outdoor scene. The sensor system 210 may provide a parameter to the lower-power operation. For example, the parameter may assist or enhance the lower-power operation, such as by assisting with an ALS function by providing information associated with a threshold for detecting changes in ambient lighting.

In some embodiments, the example sensor system 210 provides a parameter indicating an indicator of occupancy of a room or of a number of people visible in a scene viewed by the sensor system 210. For example, a higher-power operation may detect one or more faces, or one or more people, in a scene viewed by the sensor system 210. The sensor system 210 may then provide a parameter indicating a number of people or faces in a scene, or an indicator of a level of occupancy of an area. In one example, a lower-power operation, such as a MD function, may use such information to better detect motion, or to reduce a sensitivity of the MD function to motion. For example, if the sensor system 210 provides a parameter indicating a high level of occupancy, the MD function may switch to a predetermined threshold that requires a stronger indication of motion and thus the MD function is less sensitive to motion. Alternatively, if the sensor system 210 provides a parameter indicating a low level of occupancy, a MD function may increase its sensitivity when detecting motion events. In another example, a higher power operation may set the threshold and/or the minimum number of blocks for the CD operation described above.

At block 940, the sensor system 210 initiates a lower-power operation using the parameter. For example, the sensor system 210 may initiate a lower-power operation as described above with respect to FIGS. 7 and 8. In this example, the lower-power operation, after initiation, is configured to use the parameter. For instance, as discussed above, a PD function may be able to more accurately detect an object near the sensor based on the parameter, such as by establishing or adjusting a threshold intensity level. In one example, the parameter may assist or enhance the lower-power operation, such as by assisting with an ALS function by providing information associated with a threshold for detecting changes in ambient lighting.

Some embodiments may repeatedly execute the method 900. For example, after performing a higher-power operation, the sensor system 210 may restart the method 900 and initiate a lower-power operation at block 910.

As discussed above with respect to the methods 700, 800 of FIGS. 7 and 8, while the method 900 of FIG. 9 has been described as a sequence of higher-power and lower-power operations, in some examples, the sensor system 210 may substantially perform both lower-power and higher-power operations simultaneously. For example, at block 940, after performing the lower-power operation, the sensor system 210 may initiate a higher-power operation but continue to perform lower-power operations. Thus, in some examples, at block 910, while the sensor system 210 is performing a higher-power operation, the sensor system 210 may also be performing additional operations, such as lower-power operations, and by initiating a higher-power operation, the sensor system 210 may not be exclusively performing higher-power operations. Further, when the sensor system 210 initiates a lower-power operation at block 940, the sensor system 210 in some examples may continue to perform higher-power operations.

In some embodiments, one or more methods may be combined. For example, the methods of FIG. 7 or 8 may be combined with the method of FIG. 9. For example, after completing block 730 of the method 700 of FIG. 7, the method may proceed to block 920 of the method 900 of FIG. 9. In one example, after completing block 840 of the method 800 of FIG. 8, the method may proceed to block 920 of the method 900 of FIG. 9. Still further combinations are contemplated as well.

Figure 10A:
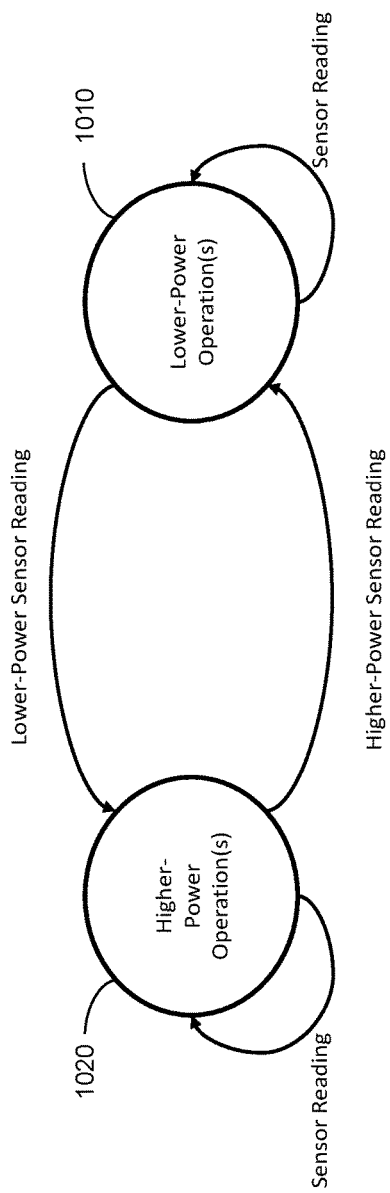
FIGS. 10A-10B are state diagrams illustrating example states of a sensor system for computer vision computations and lower-power optical sensor readings.

FIG. 10A shows an example state diagram for computer-vision computations and lower-power optical sensor readings, which may be performed by the sensor system 210. FIG. 10A includes two states, a lower-power operation(s) state 1010 and a higher-power operation(s) state 1020. In a lower-power operation(s) state 1010, the sensor system 210 is configured to perform one or more lower-power operations and may obtain one or more sensor readings. In a higher-power operation(s) state 1020, the sensor system 210 is configured to perform one or more higher-power operations, such as computer-vision computations and operations, and may obtain one or more sensor readings. In some embodiments, the sensor system 210 is configured to be in either the lower-power operation(s) state 1010 or the lower-power operation(s) state 1020, but not both simultaneously. In one such example, the sensor system 210 is configured to transition from one state to the other based on sensor readings, which may establish a one-way dependence relationship between the states. For example, in one example, execution of a higher-power operation is dependent on a sensor reading from a lower-power operation, or execution of a lower-power operation is dependent on a sensor reading from a higher-power operation.

However, in some examples, the sensor system 210 may be configured to operate in both states 1010, 1020 substantially simultaneously. For example, in one example, the sensor system 210 may comprise a plurality of sensor array units 212, one of which may be configured to perform lower-power operations and another of which may be configured to perform higher-power operations. In some examples, the sensor system 210 may subdivide a sensor array unit 212 such that a portion of the sensor array unit 212 is configured to perform a lower-power (or operations), while another portion of the sensor array unit 212 is configured to perform a higher-power operation (or operations). In one example where a sensor system 210 is configured to operate in both states 1010, 1020 substantially simultaneously, a one-way dependence relationship may be established based on a sensor reading from one of the states that causes the initiating of a specific operation in the other state or causes a reconfiguring of an operation in the other state. In some embodiments, an operation in one state may provide one or more parameter values usable by an operation in the other state, such as may be seen in FIG. 10B.

Figure 10B:
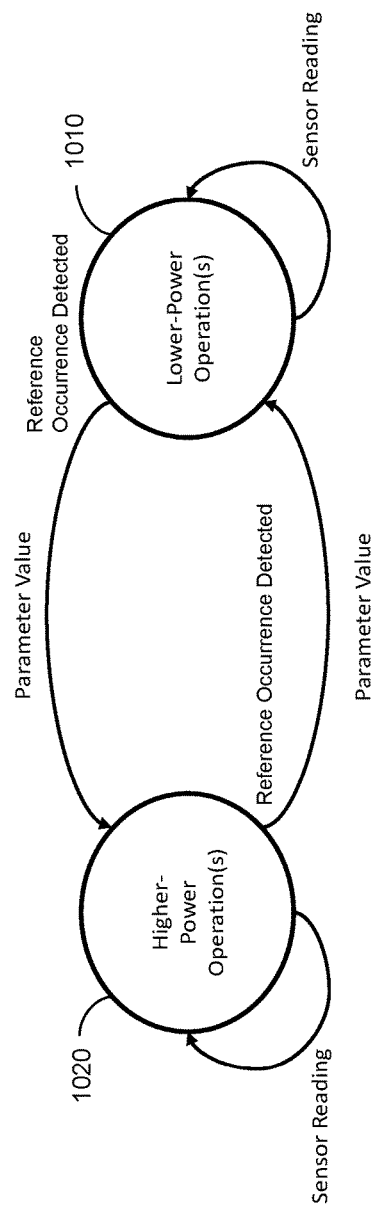

FIG. 10B shows an example state diagram for computer-vision computations and lower-power optical sensor readings, which may be performed by the sensor system 210. FIG. 10B includes the states described above with respect to FIG. 10A, but also includes state transitions or information passing between states 1010, 1020 in response to event detections in one or both of the states 1010, 1020. As with the state diagram in FIG. 10A, the sensor system 210 may transition between the two states 1010, 1020 in sequence, or may operate in both states 1010, 1020 simultaneously. The sensor system 210 can be configured to detect events in each of the states. Examples of reference occurrences are described earlier in this disclosure. As shown in FIG. 10B, the sensor system 210 provides one or more parameter values based on a detected event from a function in one state to one or more functions in the other state.

For example, if the sensor system 210 is performing a PD operation in a lower-power operation state 1010 and detects an object near the sensor system 210, the sensor system 210 provides a parameter value, such as a flag value indicating an object is detected or an estimated range to the object, to a computer-vision function in the higher-power operation state 1020, such as a face detection function. In some situations, the sensor system 210 may also transition from the lower-power operation state 1010 to the higher-power operation state 1020; however, the sensor system 210 may activate or continue executing operations in the higher-power operation(s) state 1020 using the one or more parameter values. The sensor system 210 may also detect events in the higher-power operation state 1020 and provide one or more parameter values to a lower-power operation and the sensor system may transition to the lower-power operation state or activate or continue executing operations in the lower-power operation(s) state 1020 using the one or more parameter values.

Figures 11A, 11B, 11C:
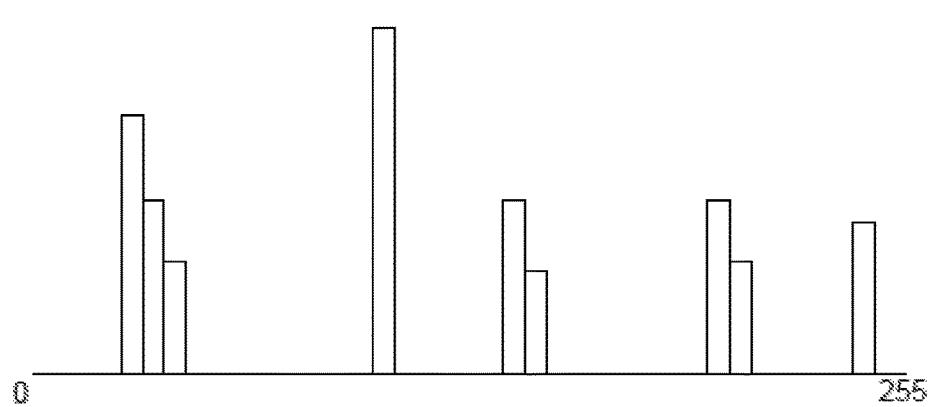
FIGS. 11A-11C illustrate a process of converting the sensor readings from a plurality of sensor elements to CV features, according to some embodiments.

FIGS. 11A, 11B and 11C illustrate a process of converting the sensor readings from a plurality of sensor elements to CV features, according to some embodiments.

FIG. 11A illustrates a group of sensor readings (window 1102) from a plurality of sensor elements of a sensor array unit (e.g., sensor array unit 212 of FIG. 2A or 2B) that are under consideration for generating a histogram and detecting features.

FIG. 11B illustrates the process of generating the binary threshold values for the center sensor element 1104 for generating an LBP label. CV computation hardware 242 of FIG. 2B can include hardware for computing the LBP label. The label generated for the center sensor element may be represented by the binary value 1111000. Similarly, an LBP label is generated for each of the nine sensory elements from window 1102. Each label may provide an indication of a CV feature from the perspective of the subject sensor element. The thresholding to generate the label may be repeated for signals corresponding to multiple subject sensor elements in the sensor array. The pixel-level LBP illustrated in FIG. 11B can be expanded to include multi-block LBP where the illustrated binary threshold values are generated for a block of one or more subject sensor elements by comparing a value corresponding to the block of one or more subject sensor elements, such a sum of the values associated with the one or more subject sensor elements in the block, to its neighboring sensor element blocks. Computations of the values corresponding to each of the blocks of sensor elements can be facilitated by computing an integral image. Similarly, it is understood that extensions of LBP may also be similarly computed, such as local ternary patterns (LTP), which provides three outputs depending on the difference between the subject sensor element and the neighboring sensor elements. For example, in one implementation of LTP, the output is one if the signal corresponding to the neighboring sensor element is greater than the signal corresponding to the subject sensor element plus a threshold, the output is zero if the signal corresponding to the neighboring sensor element is within the threshold compared to the signal corresponding to the subject sensor element, and the output is negative one if the signal corresponding to the neighboring sensor element is less than the signal corresponding to the subject sensor element minus the threshold.

FIG. 11C illustrates a normalized histogram for a window, for example a window representing some subset of sensor elements from a sensor element array, generated from the plurality of labels for each of the sensor elements from the window, for example a sample window stored in hardware scanning window array 238 of FIG. 2B. As shown in FIG. 11C, each of the LBP labels for the sensor readings from window 1102 may fall anywhere on a histogram with, for example, 256 slots. So, for example, when comparing a subject sensor element to its eight neighbors, an 8 bit number will be generated meaning that 256 different LBP labels are possible. The histogram can represent the number of times each of the given LBP labels were actually generated in the window. To determine if a face is present in the window, in one implementation, the generated histogram can be compared to a reference histogram of a face. An intersection between the generated histogram and the reference histogram can be computed, and a scalar sum generated from a summation of the intersection. If the scalar sum is greater than a threshold, then, to a given probability, a face is detected within the window. The reference histogram and the threshold are generally determined in a training phase using machine learning algorithms on a dataset of, in this example, sample faces and sample non-faces and their LBP histograms. Once the reference histogram and the threshold are determined in the training phase, for the same architecture, they can be programmed in, for example, the microprocessor 216 of FIG. 2A or 2B, or alternatively the above histogram process may be performed by dedicated hardware for computing a histogram for a given window within an image and determining whether a face, or other object, is present within the window similar to cascade classifier hardware 244 discussed in FIG. 2B above. It is understood that the LBP labels can be used by a cascade classifier for object detection, as discussed in FIG. 2B, instead of or in addition to using the LBP labels for histogram generation.

Figure 12:
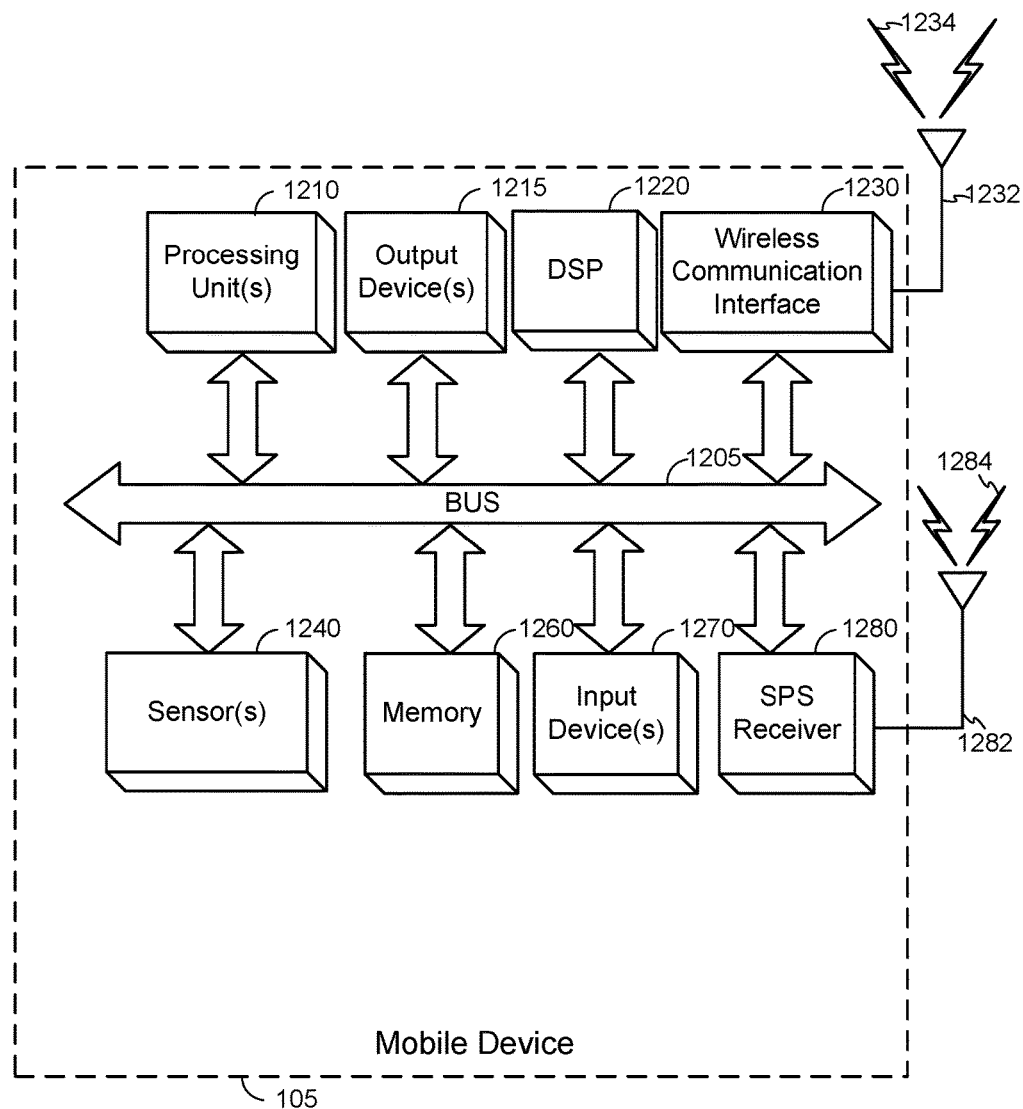
FIG. 12 is a block diagram an embodiment of a mobile device that can utilize the techniques and features described herein.

FIG. 12 illustrates an embodiment of a mobile device 105, which can utilize the sensor system 210 as described above. It should be noted that FIG. 12 is meant only to provide a generalized illustration of various components, any or all of which may be utilized as appropriate. It can be noted that, in some instances, components illustrated by FIG. 12 can be localized to a single physical device and/or distributed among various networked devices, which may be disposed at different physical locations.

The mobile device 105 is shown comprising hardware elements that can be electrically coupled via a bus 1205 (or may otherwise be in communication, as appropriate). The hardware elements may include a processing unit(s) 1210 which can include without limitation one or more general-purpose processors, one or more special-purpose processors (such as digital signal processing (DSP) chips, graphics acceleration processors, application specific integrated circuits (ASICs), and/or the like), and/or other processing structure or means. In the embodiments described above, the processing unit(s) 1210 may correspond to the main processor 220 of FIG. 2A and/or the second processing unit described in relation to FIG. 4. As shown in FIG. 12, some embodiments may have a separate DSP 1220, depending on desired functionality. The mobile device 105 also can include one or more input devices 1270, which can include without limitation a touch screen, a touch pad, microphone, button(s), dial(s), switch(es), and/or the like; and one or more output devices 1215, which can include without limitation a display, light emitting diode (LED), speakers, and/or the like.

The mobile device 105 might also include a wireless communication interface 1230, which can include without limitation a modem, a network card, an infrared communication device, a wireless communication device, and/or a chipset (such as a Bluetooth™ device, an IEEE 802.11 device, an IEEE 802.15.4 device, a WiFi device, a WiMax device, cellular communication facilities, etc.), and/or the like. The wireless communication interface 1230 may permit data to be exchanged with a network, wireless access points, other computer systems, and/or any other electronic devices described herein. The communication can be carried out via one or more wireless communication antenna(s) 1232 that send and/or receive wireless signals 1234.

Depending on desired functionality, the wireless communication interface 1230 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on. LTE, LTE Advanced, GSM, and W-CDMA are described in documents from 3GPP. Cdma2000 is described in documents from a consortium named "3rd Generation Partnership Project 2" (3GPP2). 3GPP and 3GPP2 documents are publicly available. A Wireless Local Area Network (WLAN) may also be an IEEE 802.11x network, and a Wireless Personal Area Network (WPAN) may be a Bluetooth network, an IEEE 802.15x, or some other type of network. The techniques described herein may also be used for any combination of WWAN, WLAN and/or WPAN.

The mobile device 105 can further include sensor(s) 1240. Such sensors can include, without limitation, one or more accelerometer(s), gyroscope(s), camera(s), magnetometer(s), altimeter(s), microphone(s), proximity sensor(s), light sensor(s), and the like. Additionally or alternatively, the sensor(s) 1240 may include the sensor system 210 of FIG. 2A or 2B and/or similar electronic sensors. Thus, embodiments described herein can include a first processor (e.g., microprocessor 216 in FIG. 2A or 2B) in a sensor system 210 of the sensor(s) 1240 that generates an event for a second processing unit included in the processing unit(s) 1210 of FIG. 12 (corresponding to the main processor 220 of FIG. 2A). In some embodiments, a first processing unit of sensor(s) 1240 (e.g., microprocessor 216 of sensor system 210 in FIG. 2A or 2B) can determine, from one or more signals received from the one or more outputs of an image array (e.g., sensor array unit 212 of FIG. 2A or 2B), that a face has been detected, and in response to the determination, generate a face-detection event, for a second processing unit (e.g., processing unit(s) 1210 of FIG. 12). In some embodiments, the processing unit(s) 1210 can operate in a low power mode, and a first processing unit of sensor(s) 1240 (e.g., microprocessor 216 of sensor system 210 in FIG. 2A or 2B) is operable to or generate the event to be received by and/or communicate an event to the processing unit(s) 1210 while the processing unit(s) 1210 is/are operating in a low power mode.

Embodiments of the mobile device may also include a Satellite Positioning System (SPS) receiver 1280 capable of receiving signals 1284 from one or more SPS satellites using an SPS antenna 1282. The SPS receiver 1280 can extract a position of the mobile device, using conventional techniques, from satellites of an SPS system, such as a global navigation satellite system (GNSS) (e.g., Global Positioning System (GPS)), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 1280 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The mobile device 105 may further include and/or be in communication with a memory 1260. The memory 1260 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like. The memory 218 of FIG. 2A, which can include any of the memory types previously listed, may be included in the memory 1260 or may be distinct from memory 1260, depending on desired functionality.

The memory 1260 of the mobile device 105 also can comprise software elements (not shown), including an operating system, device drivers, executable libraries, and/or other code embedded in a computer-readable medium, such as one or more application programs, which may comprise computer programs provided by various embodiments, and/ or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A device comprising:
   dedicated computer vision (CV) computation hardware configured to receive sensor data from a sensor array comprising more than one sensor pixel and capable of computing one or more CV features using readings from neighboring sensor pixels of the sensor array; and
   a first processing unit communicatively coupled with the dedicated CV computation hardware and configured to:
      process signals resulting from operations based on the one or more computed CV features, and
      in response to the processing of the signals resulting from the operations based on the one or more computed CV features, generate an event indicating a reference occurrence; and
   a second processing unit communicatively coupled with the first processing unit and configured to execute application software in response to receiving the event.

2. The device of claim 1, wherein the event is configured to indicate the reference occurrence comprises at least one of:
   a coming into view of a human face,
   a coming into view of a human body,
   an emotion expressed on a human face,
   coming into view of an non-human animal face,
   coming into view of a non-human animal body,
   coming into view of a human hand,
   a hand gesture,
   a coming into view of a reference object,
   a change from an indoor environment to an outdoor environment,
   a reference movement,
   rapid movement in a scene indicating a fall,
   motion toward an object indicating a risk of collision,
   movement or objects in a scene indicating danger, or
   any combination thereof.

3. The device of claim 1, wherein the event is configured to indicate the reference occurrence comprises object detection.

4. The device of claim 1, wherein the dedicated CV computation hardware is configured to provide Local Binary Patterns (LBPs).

5. The device of claim 1, further comprising a classifier configured to detect a presence of a reference object in a subset of the sensor data, wherein the operations based on the one or more computed CV features comprise operations performed by the classifier, the reference occurrence being associated with the reference object.

6. The device of claim 5, wherein the first processing unit is configured to receive an indication from the classifier of the presence of the reference object when the presence of the reference object is detected by the classifier.

7. The device of claim 5, wherein the classifier comprises a cascade classifier comprising software executed by the first processing unit.

8. The device of claim 1, wherein the dedicated CV computation hardware comprises an integrated circuit.

9. The device of claim 1, wherein the first processing unit is further configured to disable at least part of the dedicated CV computation hardware to generate at least one lower-power optical sensor reading indicative of ambient light sensing, a proximity detection, a proximity to a reference object, a motion detection, or any combination thereof for use by the second processing unit.

10. The device of claim 1, wherein the first processing unit is configured to disable at least part of the dedicated CV computation hardware while operating in a lower-power mode, detect a scene change in the lower-power mode, and to activate the dedicated CV computation hardware based on detection of the scene change.

11. The device of claim 1, wherein the first processing unit is configure to include, in the event, data associated with the reference occurrence.

12. The device of claim 11, wherein the second processing unit is configured to execute the application software in response to receiving the event comprises the second processing unit utilizing the data associated with the reference occurrence while executing the application software.

13. The device of claim 1, wherein the first processing unit is configured to:
   perform a higher-power operation as at least part of the operations based on the one or more computed CV features, the higher-power operation consuming more power than a lower-power operation, and
   provide a parameter for the lower-power operation based on the higher-power operation.

14. The device of claim 13, wherein the lower-power operation includes one or more from the list comprising: ambient light sensing, proximity detection, motion detection, or change detection.

15. A device comprising:
   a sensor array comprising more than one sensor pixel;
   dedicated computer vision (CV) computation hardware capable of receiving sensor data from the sensor array and computing CV features using readings from neighboring sensor pixels of the sensor array;
   a first processing unit communicatively coupled with the dedicated CV computation hardware and configured to:
      determine, from one or more signals resulting from operations based on the one or more computed CV features that a face has been detected, and
      in response to the determination, generate an object-detected event; and
   a second processing unit communicatively coupled with the first processing unit and configured to execute application software in response to receiving the object-detected event.

16. The device of claim 15, wherein the first processing unit is configured to communicate the object-detected event to the second processing unit while the second processing unit is operating in a low-power mode.

17. The device of claim 15, wherein the dedicated CV computation hardware is configured to receive raw sensor data from the sensor array and no image signal processing circuitry is disposed between the sensor array and the dedicated CV computation hardware.

18. The device of claim 15, further comprising peripheral circuitry configured to provide at least one of:
a timing operation,
a focusing operation,
an auto-exposure correction operation,
object detection,
object recognition,
storing a scanning window,
an event-queuing and/or processing operation,
analog processing,
analog-to-digital conversion,
an integration operation,
CV feature computation,
a cascade-classifier-based classification,
a histogram-based classification, or
memory buffering, or
any combination thereof.

19. A method for sensing dynamic scene-based occurrences with an apparatus, the method comprising:
receiving, with dedicated computer vision (CV) computation hardware, sensor data from a sensor array comprising more than one sensor pixel;
computing, with the dedicated CV computation hardware, one or more CV features using readings from neighboring sensor pixels of the sensor array;
processing, with a first processing unit, signals resulting from operations based on the one or more computed CV features;
generating an event in response to the processing of the signals resulting from the operations based on the one or more computed CV features by the first processing unit, the event indicating a reference occurrence for a second processing unit; and
executing, with a second processing unit, application software in response to the event configured.

20. The method of claim 19, wherein the reference occurrence is one or more of:
a coming into view of a human face,
a coming into view of a human body,
an emotion expressed on a human face,
coming into view of an non-human animal face,
coming into view of a non-human animal body,
coming into view of a human hand,
a hand gesture,
a coming into view of a reference object,
a change from an indoor environment to an outdoor environment,
a reference movement,
rapid movement in a scene indicating a fall,
motion toward an object indicating a risk of collision,
movement or objects in a scene indicating danger, or
any combination thereof.

21. The method of claim 19, further comprising providing, with the dedicated CV computation hardware, Local Binary Patterns (LBPs).

22. The method of claim 19, further comprising detecting, with a classifier, a presence of a reference object in a subset of the sensor data, wherein the operations based on the one or more computed CV features comprise operations performed by the classifier, the reference occurrence being associated with the reference object.

23. The method of claim 22, further comprising, receiving, by the first processing unit, an indication from the classifier of the presence of the reference object when the presence of the reference object is detected by the classifier.

24. The method of claim 22, wherein the classifier comprises software executed by the first processing unit.

25. The method of claim 22, wherein the classifier comprises hardware separate from the first processing unit.

26. The method of claim 19, further comprising:
disabling at least part of the dedicated CV computation hardware while operating in a lower-power mode;
detecting a scene change while operating in the lower-power mode; and
activating the disabled at least part of the dedicated CV computation hardware based on detection of the scene change.

27. The method of claim 19, wherein, receiving, with the dedicated CV computation hardware, the sensor data from the sensor array comprises receiving raw sensor data from the sensor array and wherein no image signal processing is performed on the sensor data prior to the receiving.

28. A method for determining object detection events, the method comprising:
receiving, with dedicated computer vision (CV) computation hardware, sensor data from a sensor array;
computing one or more CV features using readings from neighboring sensor pixels of the sensor array;
using a first processing unit to:
determine, from one or more signals resulting from operations based on the one or more computed CV features that an object has been detected, and
in response to the determination, generate an object-detected event; and
using a second processing unit to, in response to receiving the object-detected event, execute application software.

29. The method of claim 28, further comprising using the first processing unit to communicate the object-detected event to the second processing unit while the second processing unit is operating in a low-power mode.

30. The method of claim 28, wherein, receiving, with the dedicated CV computation hardware, the sensor data from the sensor array comprises receiving raw sensor data from the sensor array and wherein no image signal processing is performed on the sensor data prior to the receiving.

* * * * *